US010758039B2

(12) United States Patent
Allen et al.

(10) Patent No.: US 10,758,039 B2
(45) Date of Patent: Sep. 1, 2020

(54) PLATFORM WITH ADJUSTABLE HEIGHT

(71) Applicant: WORKRITE ERGONOMICS, INC., Petaluma, CA (US)

(72) Inventors: Robert Allen, Richmond Heights, OH (US); William Rabbitt, Chesterland, OH (US)

(73) Assignee: WORKRITE ERGONOMICS, INC., Petaluma, CA (US)

( * ) Notice: Subject to any disclaimer, the term of this patent is extended or adjusted under 35 U.S.C. 154(b) by 0 days.

(21) Appl. No.: 16/004,915

(22) Filed: Jun. 11, 2018

(65) Prior Publication Data

US 2019/0374023 A1 Dec. 12, 2019

(51) Int. Cl.
| | |
|---|---|
| *A47B 9/00* | (2006.01) |
| *A47B 17/02* | (2006.01) |
| *A47B 9/20* | (2006.01) |
| *F16H 25/20* | (2006.01) |

(52) U.S. Cl.
CPC .............. *A47B 17/02* (2013.01); *A47B 9/20* (2013.01); *F16H 25/20* (2013.01); *A47B 2200/006* (2013.01); *A47B 2200/0051* (2013.01); *A47B 2200/0058* (2013.01); *A47B 2200/0059* (2013.01); *F16H 2025/209* (2013.01)

(58) Field of Classification Search
CPC ....... A47B 9/00; A47B 9/04; A47B 2009/043; A47B 2009/046
See application file for complete search history.

(56) References Cited

U.S. PATENT DOCUMENTS

| | | | | |
|---|---|---|---|---|
| 5,088,421 A | * | 2/1992 | Beckstead | A47B 9/12 108/147 |
| 5,626,328 A | * | 5/1997 | Schneider | A47B 9/04 254/98 |
| 6,678,907 B1 | * | 1/2004 | Voelker | A61G 7/012 5/11 |
| 2002/0145088 A1 | * | 10/2002 | Santoro | A47B 9/04 248/188.2 |

(Continued)

FOREIGN PATENT DOCUMENTS

| | | | | |
|---|---|---|---|---|
| DE | 3215572 A1 | * | 10/1983 | ............. A47B 51/00 |
| DE | 102012024805 A1 | * | 6/2014 | ............... A47B 9/04 |
| FR | 2747280 A1 | * | 10/1997 | ............... A47B 9/04 |

OTHER PUBLICATIONS

English translation of Seifritz (DE102012024805) (Year: 2019).*
English translation of Droege (DE3215572) (Year: 2019).*
English translation of Capelli (FR2747280) (Year: 2019).*

*Primary Examiner* — Matthew W Ing
(74) *Attorney, Agent, or Firm* — Gardner Linn

(57) ABSTRACT

An adjustable platform having an upper platform surface, at least two leg assemblies supporting the upper platform surface, and a drive mechanism that is configured to extend or retract the leg assemblies between a first position, in which each leg assembly is retracted to lower the platform toward ground, and a second position, in which each leg assembly is extended to raise the platform away from the ground. The drive mechanism includes a single motor that is drivingly coupled to each of the at least two leg assemblies, in which the drive mechanism is configured to simultaneously extend or retract both of the at least two leg assemblies between the first position and second position to thereby lower or raise the upper platform surface relative to the ground.

18 Claims, 16 Drawing Sheets

(56) References Cited

U.S. PATENT DOCUMENTS

| | | | |
|---|---|---|---|
| 2011/0174101 A1* | 7/2011 | Prottengeier | A47B 9/04 74/110 |
| 2016/0345722 A1* | 12/2016 | Chen | A47B 9/04 |
| 2018/0172062 A1* | 6/2018 | Hu | A47B 9/04 |
| 2018/0177288 A1* | 6/2018 | Lin | A47B 9/04 |

* cited by examiner

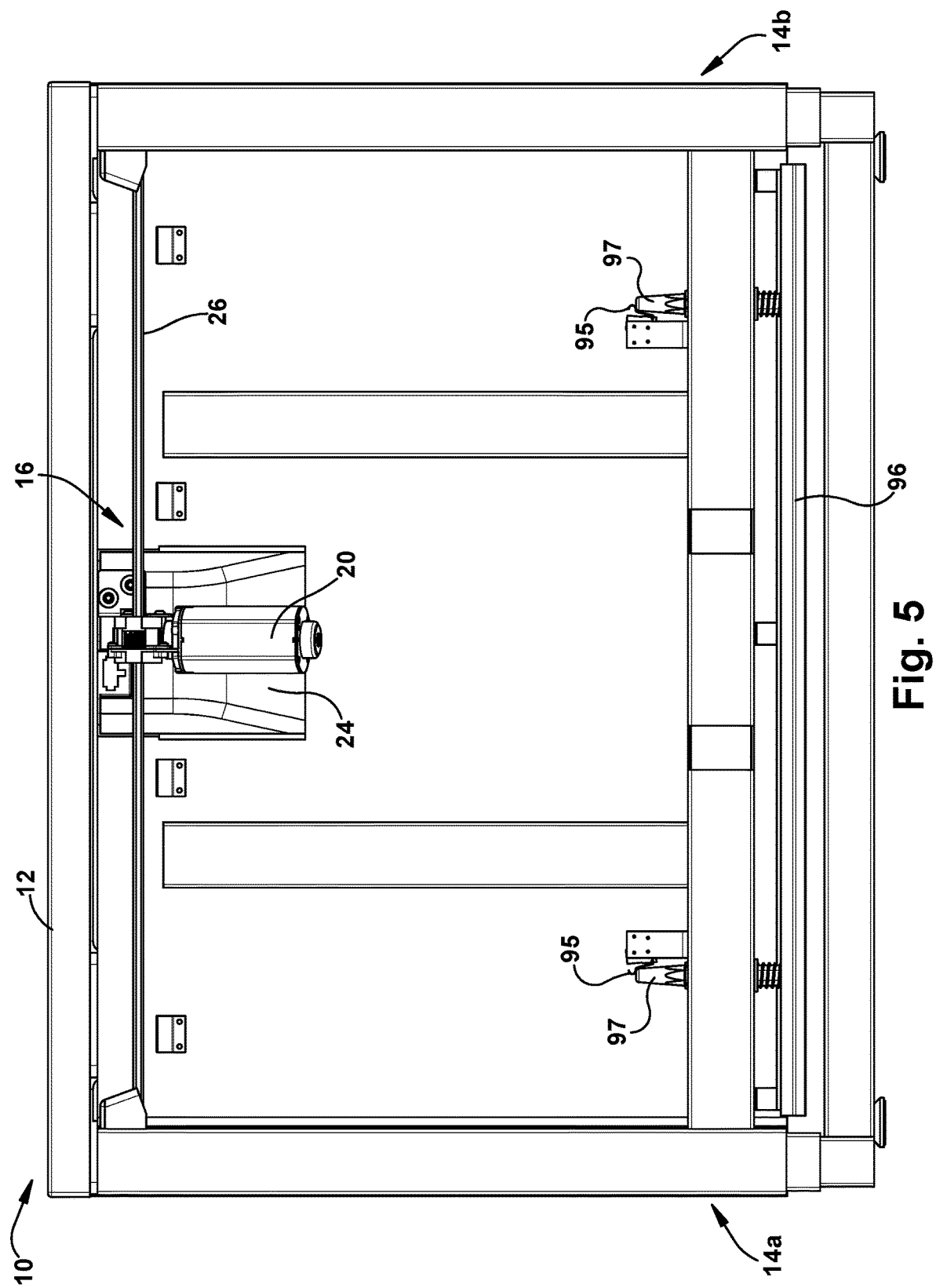

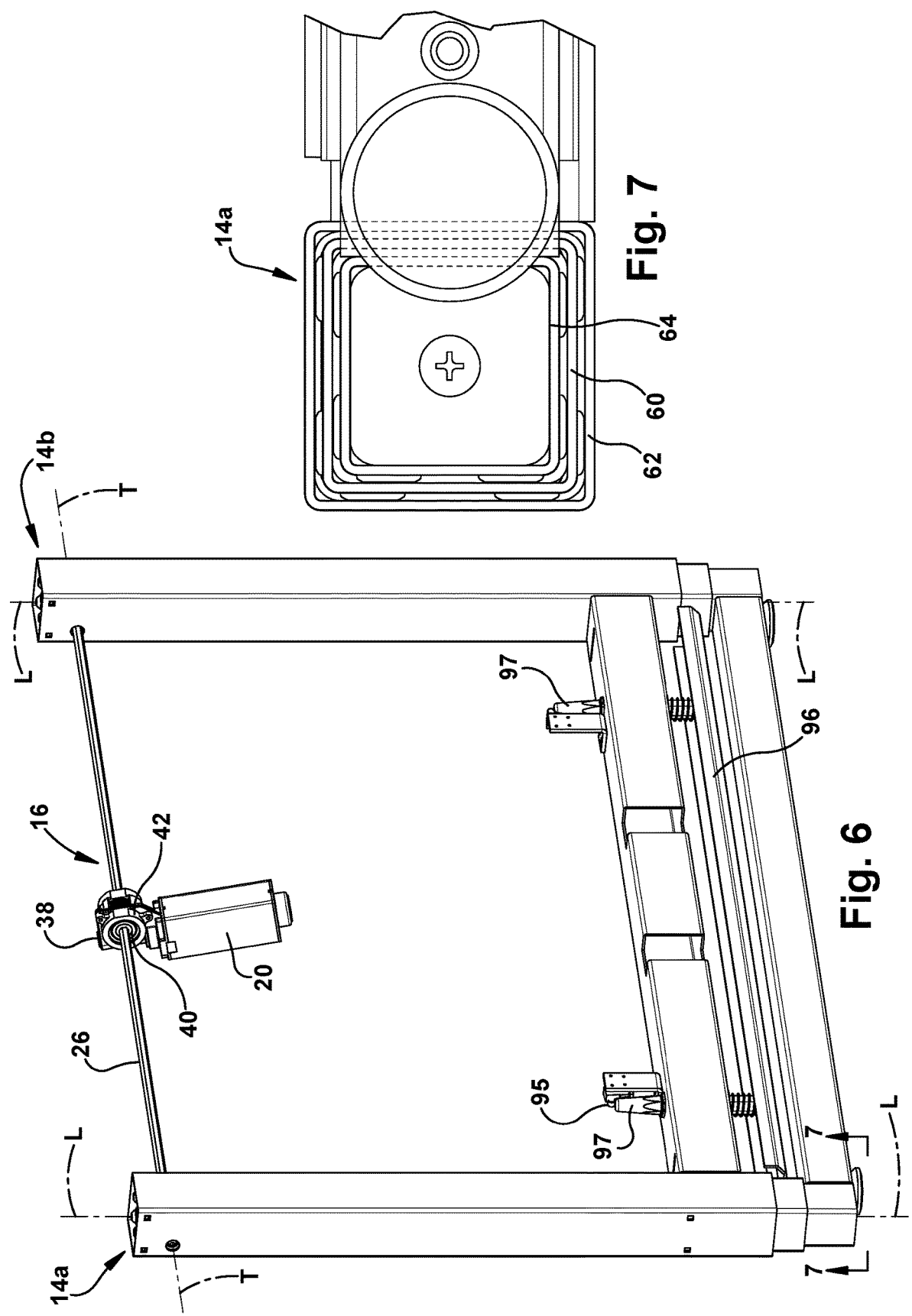

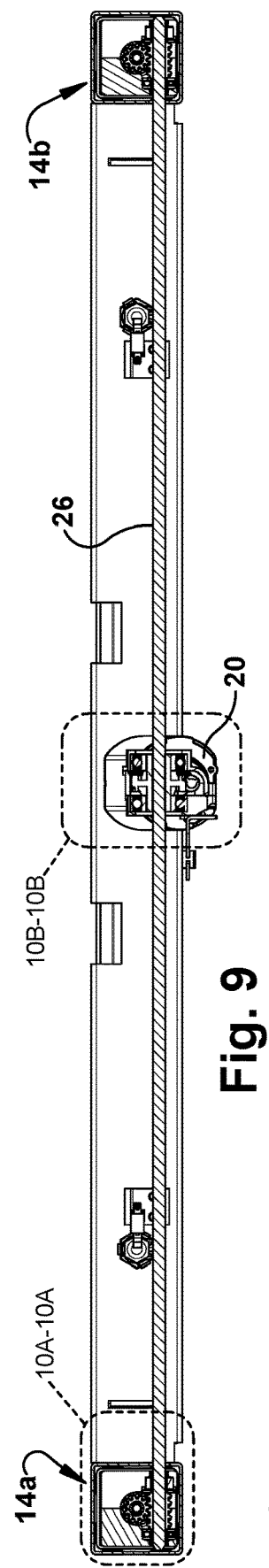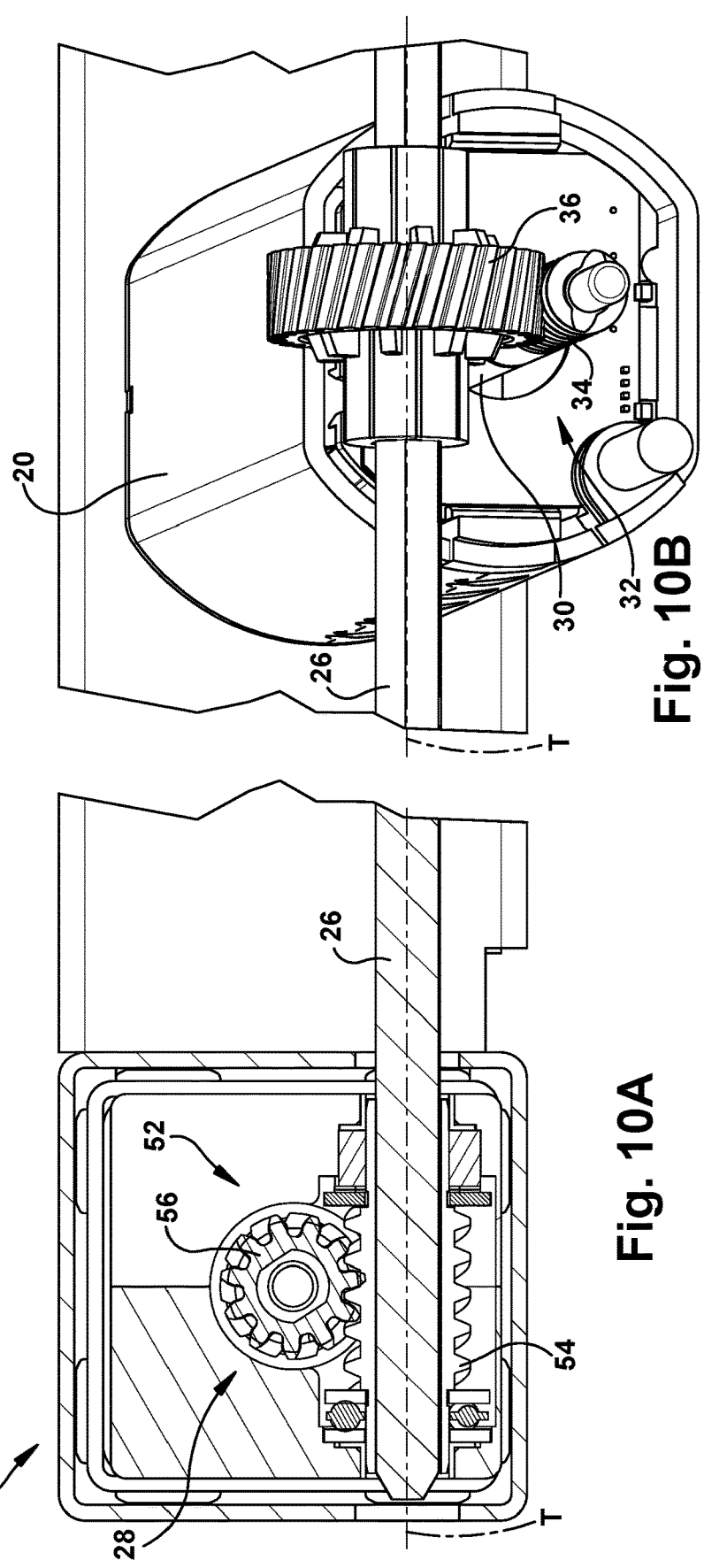

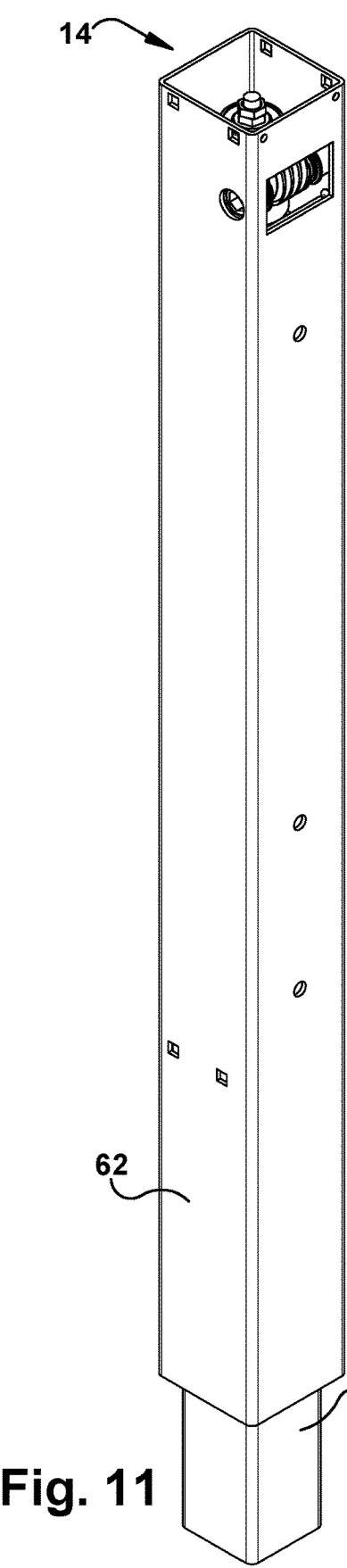
Fig. 11
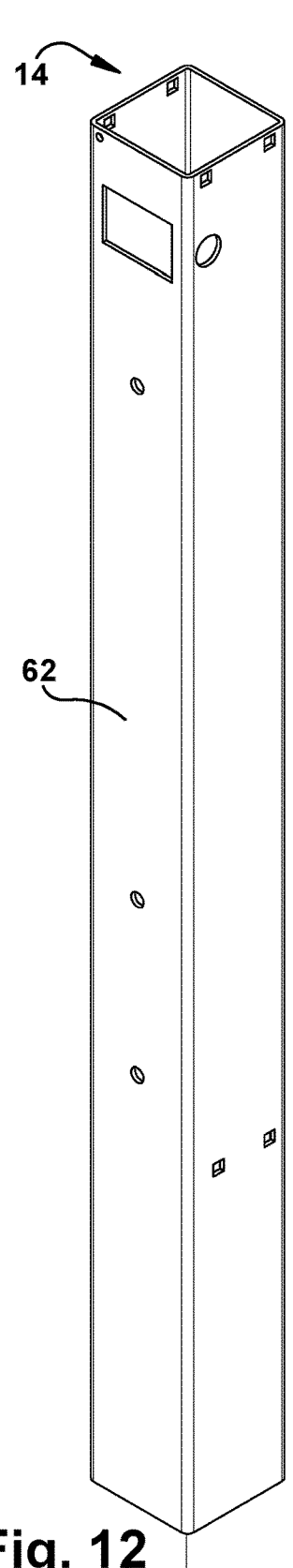 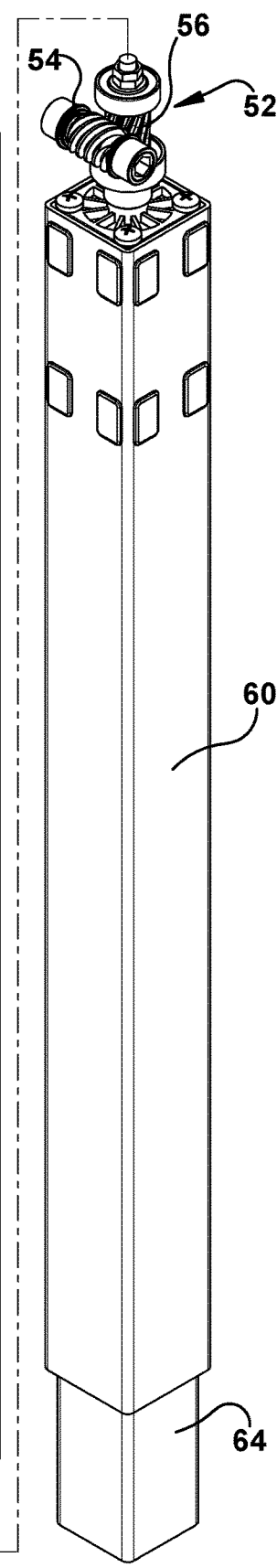
Fig. 12

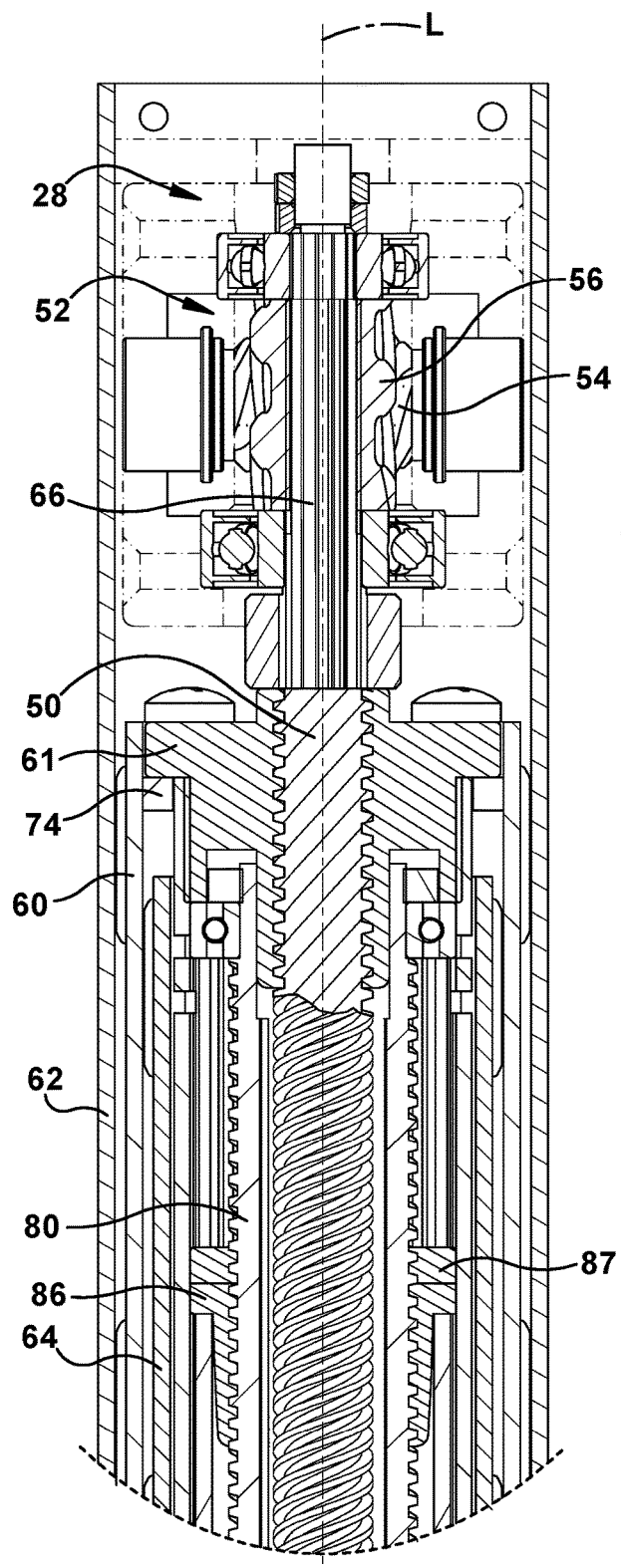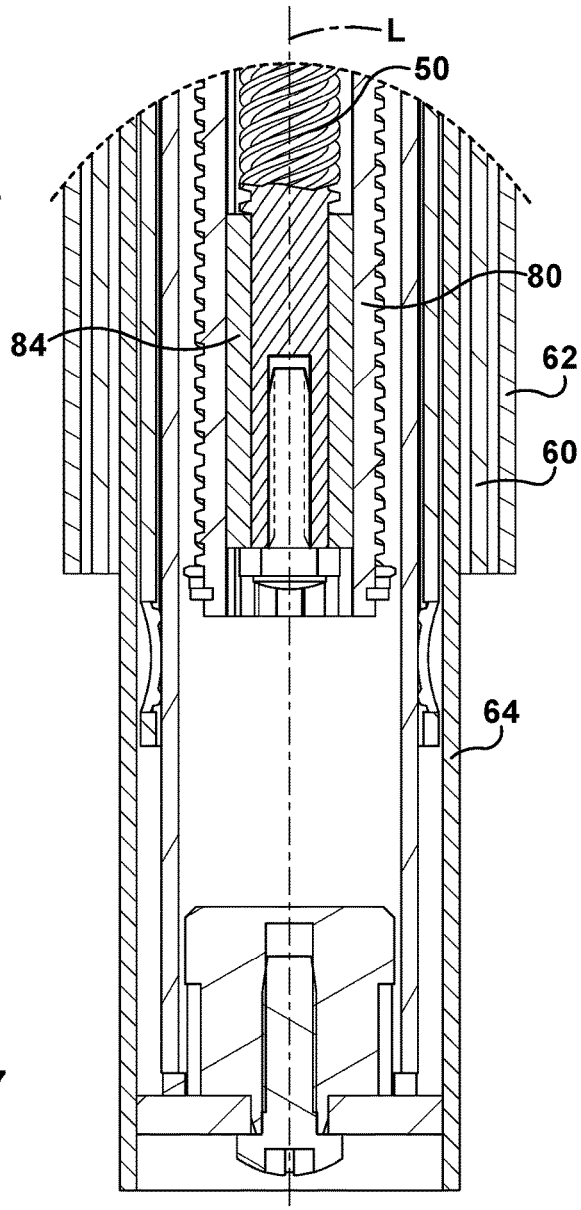
Fig. 16
Fig. 17

PLATFORM WITH ADJUSTABLE HEIGHT

TECHNICAL FIELD

The present disclosure relates generally to an adjustable platform, and more particularly to an adjustable platform, such as a desk, having a drive mechanism that simultaneously actuates at least two leg assemblies for raising or lowering the platform.

BACKGROUND

Tables, desks, or other such platforms may have one or more leg assemblies that are adjustable to vary the height of the platform. The adjustment of the platform height is sometimes manual, and may require the user to carefully balance objects on the platform, while also exerting enough force to lift the platform along with the weight of those objects. Automatic adjustment mechanisms for platforms are also know, but typically have a complicated and expensive construction.

SUMMARY

The present disclosure provides an adjustable platform having at least one drive mechanism that extends or retracts one or more leg assemblies for raising or lowering the platform, in which the adjustable platform provides a simplified construction with a reduced number of drive components for minimizing cost, while also offering enhanced flexibility in the design of the platform by allowing the unique features of the platform to be adapted to different product configurations.

More particularly, the present disclosure provides such an adjustable platform in which a drive mechanism uses a single motor to simultaneously extend or retract at least two leg assemblies for raising or lowering the platform relative to the ground. Such a configuration minimizes the number of drive components that may otherwise be required for driving each leg assembly independently, and improves the ability to control the simultaneous movement of each leg assembly so that the platform may remain level.

According to an aspect of the present disclosure, an adjustable platform includes: an upper platform surface; at least two leg assemblies operatively coupled to and supporting the upper platform surface, each of the pair of leg assemblies being configured to extend or retract between a first position, in which the leg assembly is retracted to lower the upper platform surface toward ground, and a second position, in which the leg assembly is extended to raise the upper platform surface away from the ground; and a drive mechanism having a single motor drivingly coupled to each of the at least two leg assemblies; wherein the drive mechanism is configured to simultaneously extend or retract each of the at least two leg assemblies between the first position and second position to thereby lower or raise the upper platform surface relative to the ground.

Embodiments according to the present disclosure may include one or more of the following additional features, separately or in any combination.

For example, the motor may be drivingly coupled to a single drive shaft that is drivingly coupled to each of the at least two leg assemblies, the drive shaft being rotatable by the motor to drive a linear actuator in each of the at least two leg assemblies, which thereby extends or retracts the leg assemblies.

The linear actuator in each leg assembly may include a movable rod that extends along a longitudinal axis and at least partially supports the upper platform surface, the movable rod being drivingly coupled to a linkage, wherein the drive shaft is configured to drive the movable rod via the linkage, and wherein the movable rod is configured to move axially along the longitudinal axis relative to ground to raise or lower the upper platform surface when driven by the drive shaft via the linkage.

The drive shaft may extend between the at least two leg assemblies along a transverse axis that is transverse to the longitudinal axis of each of the at least two leg assemblies; and the linkage in each of the at least two leg assemblies may include a gear train that drivingly couples the drive shaft to the movable rod, the gear train being configured to translate rotational movement of the drive shaft about the transverse axis into simultaneous movement of each rod, such that each rod of the at least two leg assemblies moves axially along the longitudinal axis to simultaneously extend or retract each of the at least two leg assemblies between the first position and second position, thereby lowering or raising the upper platform surface relative to the ground.

The gear train may translate rotational movement of the drive shaft about the transverse axis into rotation of each rod about its longitudinal axis, in which each rod is configured to interact with a portion of a support member of each of the at least two leg assemblies that extends along the longitudinal axis, such that the rod moves axially along the longitudinal axis relative to the support member and the ground.

The support member of each of the at least two leg assemblies may include a portion having an internally threaded bore, and the movable rod of each of the at least two leg assemblies may include a rotatable screw having threads that are threadably received by the internally threaded bore. The gear train may translate rotational movement of the drive shaft about the transverse axis into rotation of the screw about its longitudinal axis, such that the screw is configured to screw into and out of the internally threaded bore of the support member, thereby moving the screw axially along the longitudinal axis relative to the support member and the ground.

Each of the at least two leg assemblies may be a telescoping leg assembly having at least one outer support member and at least one inner support member that is telescopically movable in the at least one outer support member, such that in the first position each leg assembly is telescopically collapsed, and in the second position each leg assembly is telescopically extended.

More particularly, each of the at least two leg assemblies may be a telescoping leg assembly having an outer support member, an intermediate support member telescopically movable in the outer support member, and an inner support member telescopically movable in the intermediate support member. The rotatable screw may be a first screw having a first end portion operatively coupled to a downstream gear of the gear train, such that rotation of the drive shaft drives the rotation of the first screw. The first end portion of the first screw may be operatively coupled to the outer support member for common axial movement therewith, and the portion of the support member having the internally threaded bore may be a first receiver configured to threadably receive the first screw and being operatively coupled to the intermediate support member for common axial movement therewith. In this manner, when the first screw is threadably screwed into or out of the first receiver, the outer support member moves axially relative to the intermediate support member.

Each of the at least two leg assemblies may further include a second screw extending along the longitudinal axis, the second screw having an axially extending internal bore with radially inwardly projecting spline teeth that extend axially along at least a portion of the internal bore. The first screw may be slidably disposed within the internal bore of the second screw, the first screw having a portion with radially outwardly projecting spline teeth that are configured to engage the radially inwardly projecting spline teeth of the second screw to drive rotation of the second screw with the first screw as the first screw moves axially relative to the second screw. Each leg assembly may include a second receiver configured to threadably receive the second screw, the second receiver being operatively coupled to the inner support member for common axial movement therewith. When the second screw is threadably screwed into or out of the second receiver, the inner support member moves axially relative to the intermediate support member.

The gear train may include a worm gear train having a worm screw operatively coupled to the drive shaft and a worm gear operatively coupled to the movable rod, in which the worm screw meshingly engages with the worm gear.

The motor may be an electric motor having an output shaft that is drivingly coupled to the drive shaft.

The output shaft of the motor may extend along an axis that is transverse to an axis of the drive shaft, and a gear train may be operatively coupled to the output shaft of the motor and the drive shaft to translate rotational motion of the output shaft to rotational motion of the drive shaft.

The adjustable platform may have one or more side panels extending between the at least two leg assemblies, the side panel being configured to conceal the drive mechanism, including a housing portion that contains the motor.

The at least two leg assemblies may extend upright along a vertical plane, and the motor may be inclined relative to the vertical plane.

The adjustable platform may further include a transverse bumper bar extending between the at least two leg assemblies, the transverse bumper bar having at least one spring-loaded pin that is configured to activate a switch that deactivates the drive mechanism when the bumper bar compresses the spring beyond a predefined distance.

The adjustable platform may be an adjustable desk, in which the at least two leg assemblies is a first pair of leg assemblies drivingly coupled to the single motor, the desk having a second pair of leg assemblies that is drivingly coupled to a second single motor of a second drive mechanism; and the first drive mechanism and the second drive mechanism are configured to simultaneously extend or retract the first pair of leg assemblies and the second pair of leg assemblies to thereby lower or raise the upper platform surface parallel to the ground.

The adjustable platform may further include a controller that is configured to control the drive mechanism.

The controller may be configured to monitor output of the motor and/or monitor the extension or retraction of the at least two leg assemblies, and the controller may be configured to deactivate the drive mechanism when the at least two leg assemblies are in the first position and/or second position.

The controller may be operatively coupled to a user interface. The user interface may include one or more of the following: (i) an input for raising the platform, in which the controller is configured to activate the drive mechanism to raise the platform toward the second position; (ii) an input for lowering the platform, in which the controller is configured to activate the drive mechanism to lower the platform toward the first position; (iii) an input for setting a desired lowered position, in which the desired lowered position is stored in a non-transitory computer readable storage medium; (iv) an input for selecting the desired lowered position, in which the controller is configured to activate the drive mechanism to automatically move the platform to the desired lowered position; (v) an input for setting a desired raised position, in which the desired raised position is stored in a non-transitory computer readable storage medium; and (vi) an input for selecting the desired raised position, in which the controller is configured to activate the drive mechanism to automatically move the platform to the desired raised position.

The following description and the annexed drawings set forth certain illustrative embodiments according to the present disclosure. These embodiments are indicative, however, of but a few of the various ways in which the principles according to the present disclosure may be employed. Other objects, advantages and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects according to the present disclosure.

FIG. 5 is a side plan view of the adjustable platform in FIG. 4.

FIG. 6 is a perspective view of the exemplary drive mechanism and leg assemblies in FIG. 4 with the remainder of the adjustable desk removed.

FIG. 7 is an end plan view taken along the line 7-7 in FIG. 6.

FIG. 9 is a top plan view of the drive mechanism and leg assemblies.

FIG. 10A is an enlarged cross-sectional view of section 10A-10A in FIG. 9.

FIG. 10B is an enlarged perspective view from section 10B-10B in FIG. 9.

FIG. 11 is a perspective view of the exemplary leg assembly.

FIG. 12 is a partially exploded perspective view of the leg assembly in FIG. 11.

FIG. 16 is an enlarged cross-sectional view of section 16-16 in FIG. 14.

FIG. 17 is an enlarged cross-sectional view of section 17-17 in FIG. 14.

DETAILED DESCRIPTION

The principles and aspects of the present disclosure have particular application to adjustable support mechanisms for use with tables, chairs, beds, desks, or other such platforms, and thus will be described below chiefly in this context. It is also understood, however, that principles and aspects of this disclosure may be applicable to adjustable platforms for other applications where it is desirable to provide, among other things, a relatively simple design with minimized costs, and enhanced flexibility in adapting such a design to other product configurations.

Figure 1:
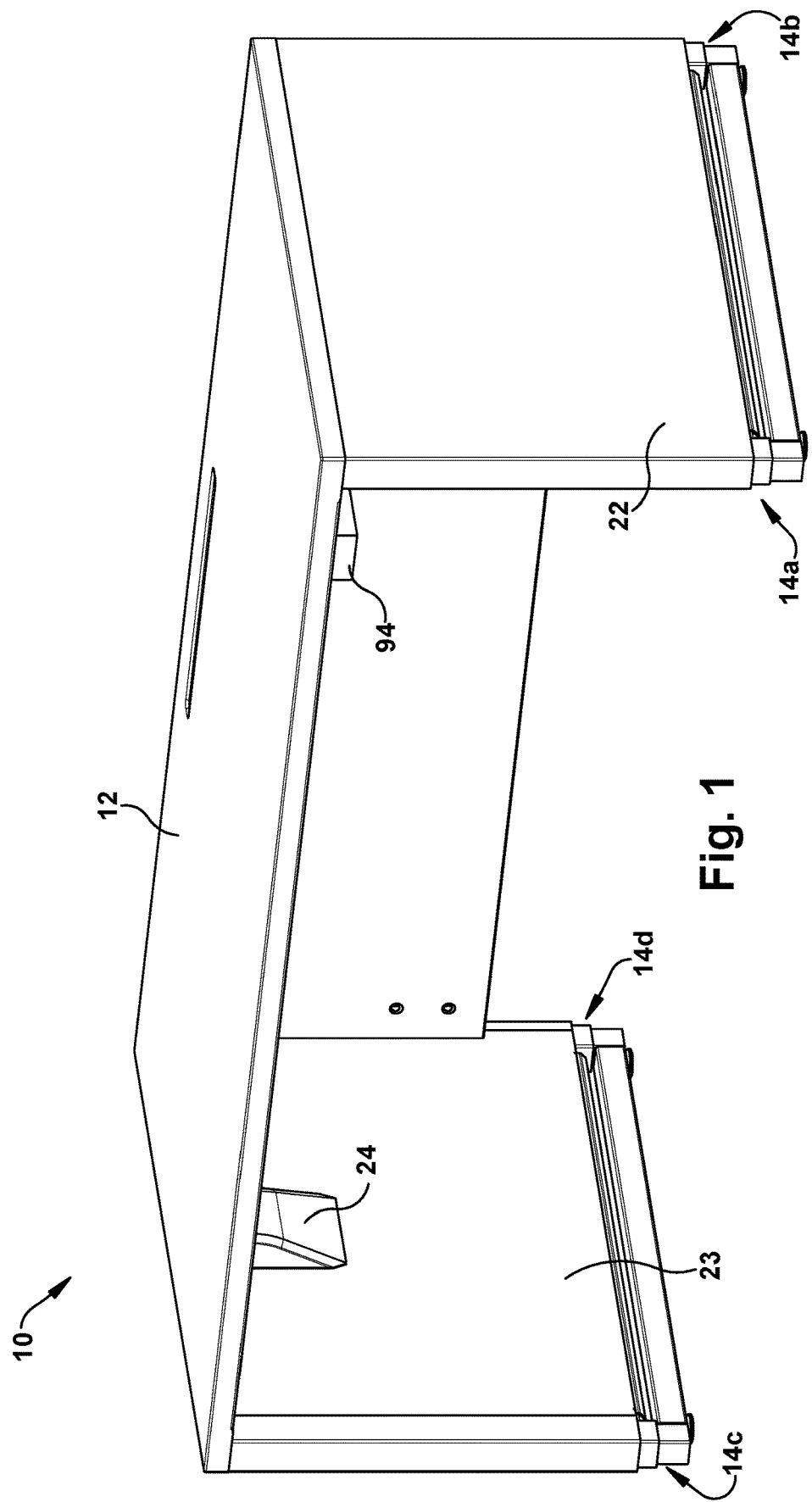
FIG. 1 is a perspective front view of an exemplary adjustable platform according to the present disclosure, which is shown in an exemplary lowered position.
Figure 2:
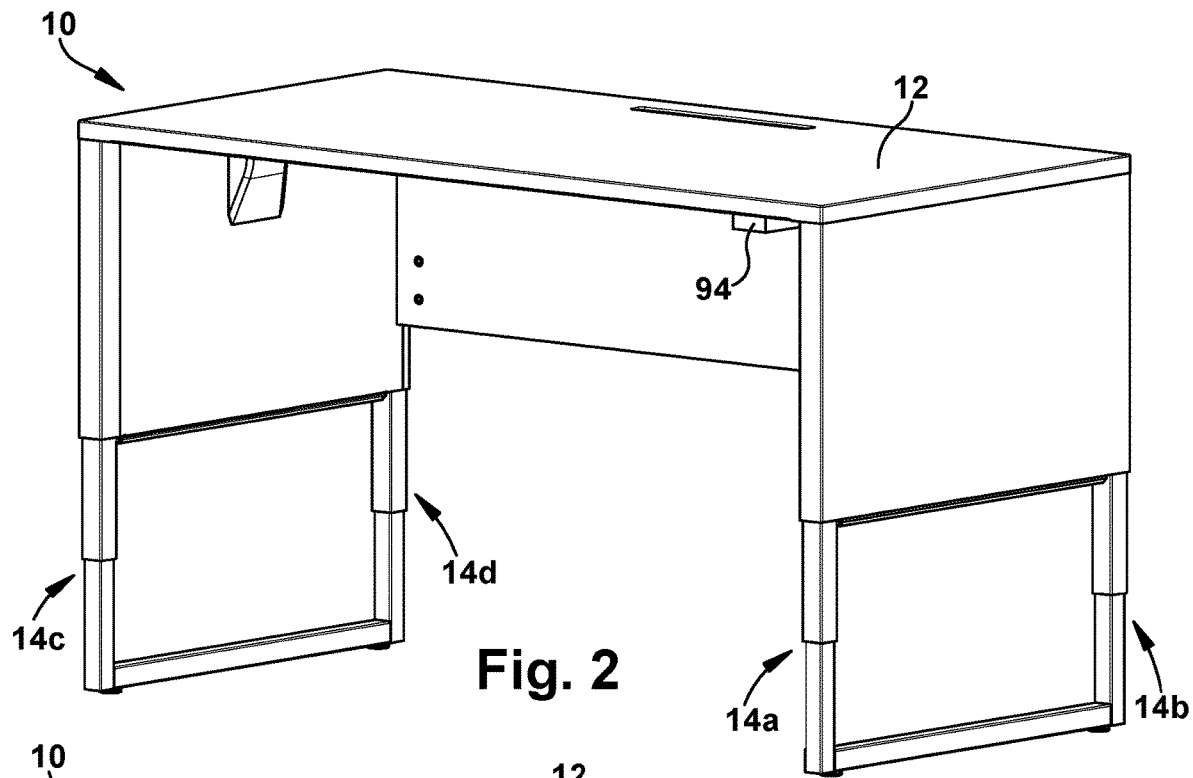
FIG. 2 is a perspective front view of the adjustable platform in an exemplary intermediate position.
Figure 3:
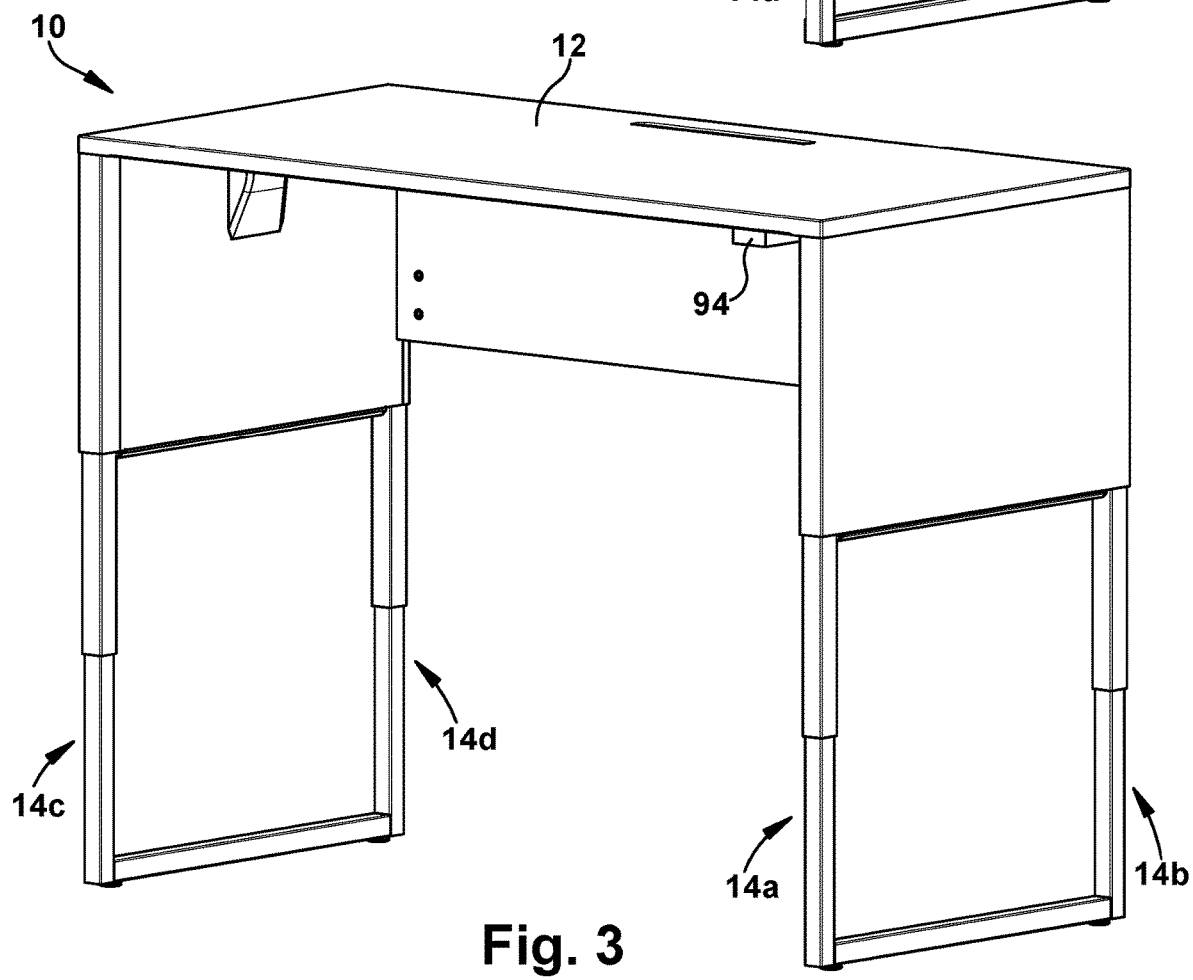
FIG. 3 is a perspective front view of the adjustable platform in an exemplary raised position.
Figure 4:
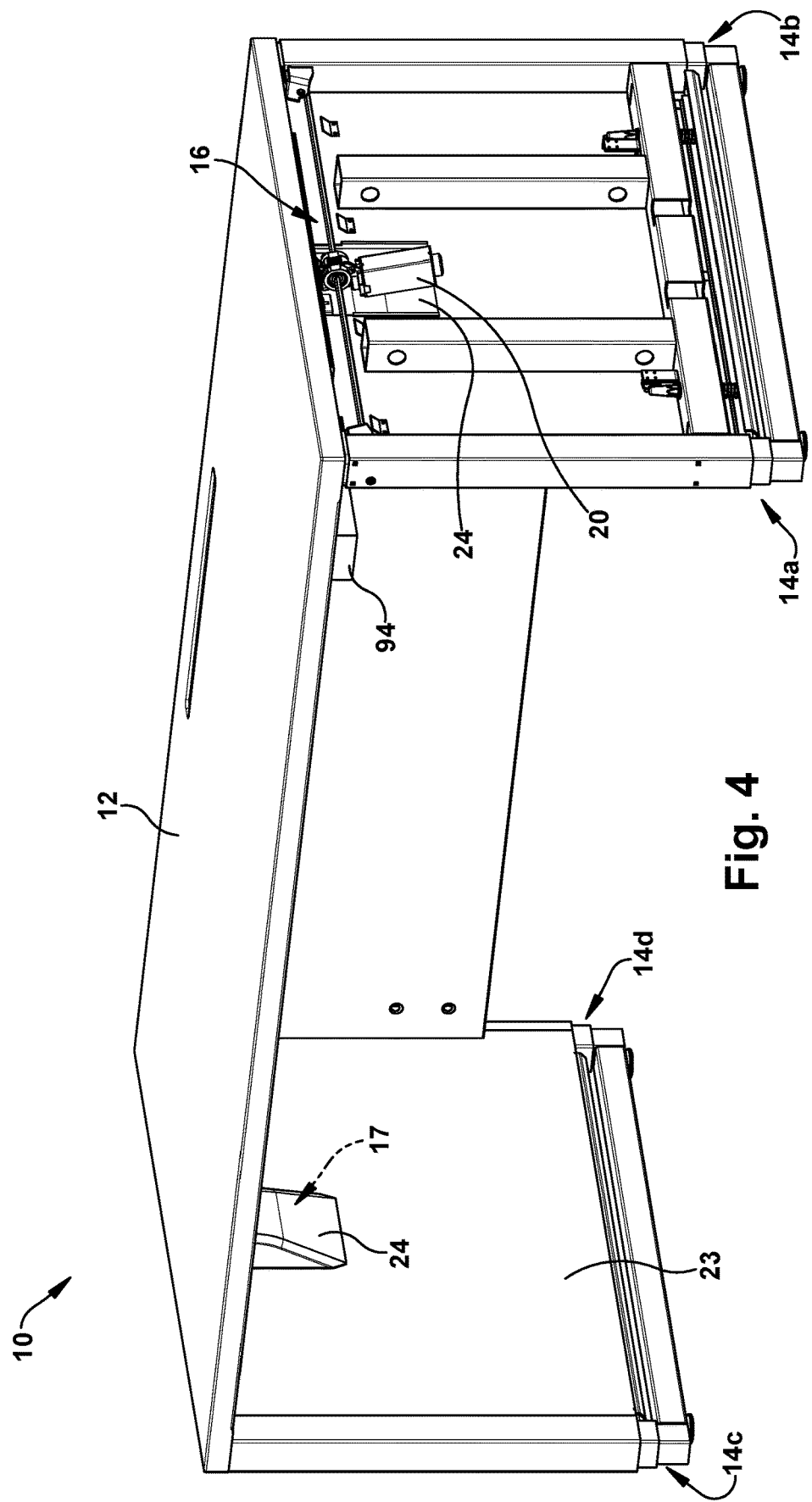
FIG. 4 is a perspective front view of the adjustable platform with one of the side panels removed and showing an exemplary drive mechanism and exemplary leg assemblies according to the present disclosure.
Figure 8:
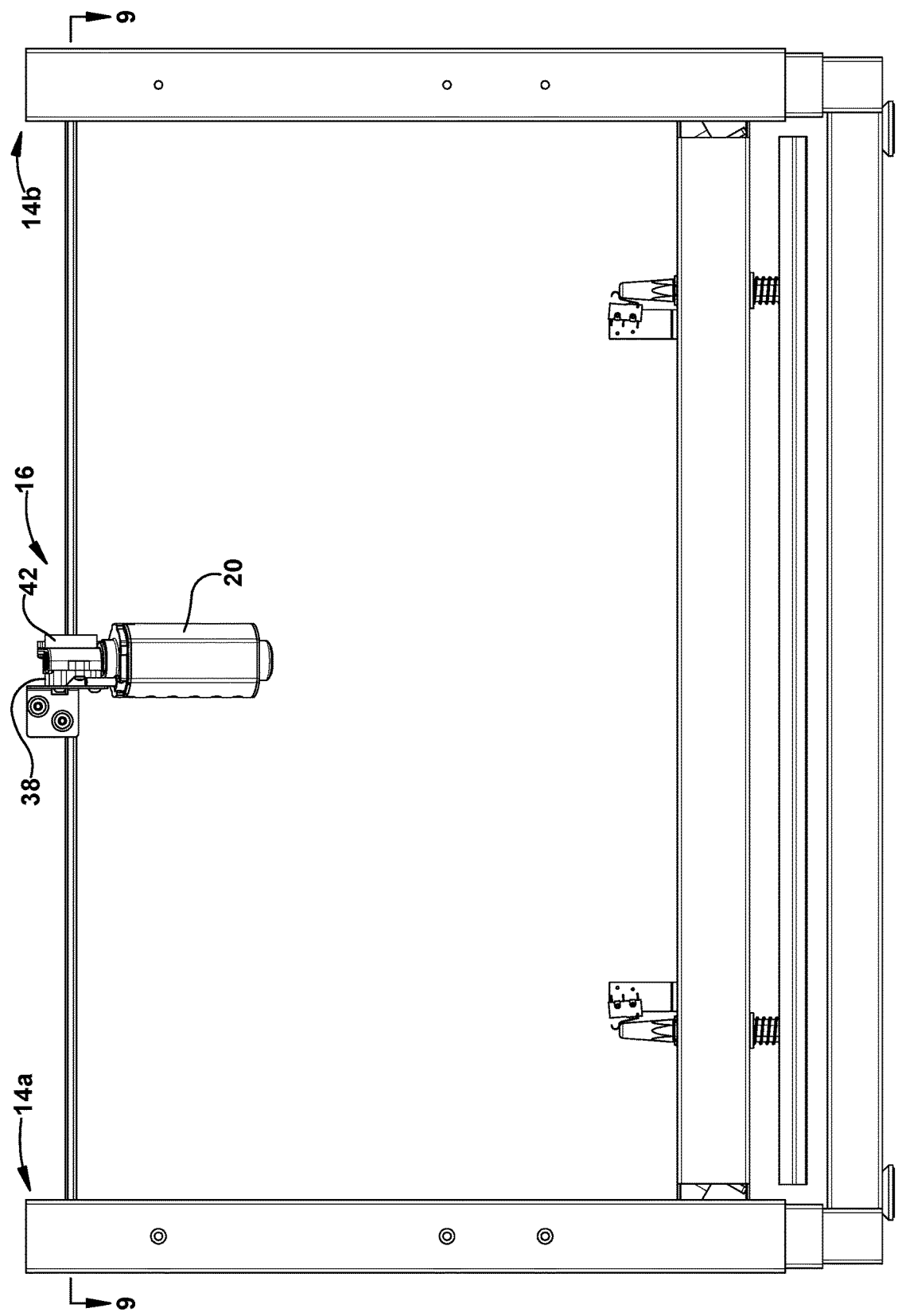
FIG. 8 is a side plan view of the drive mechanism and leg assemblies in FIG. 6.
Figure 13:
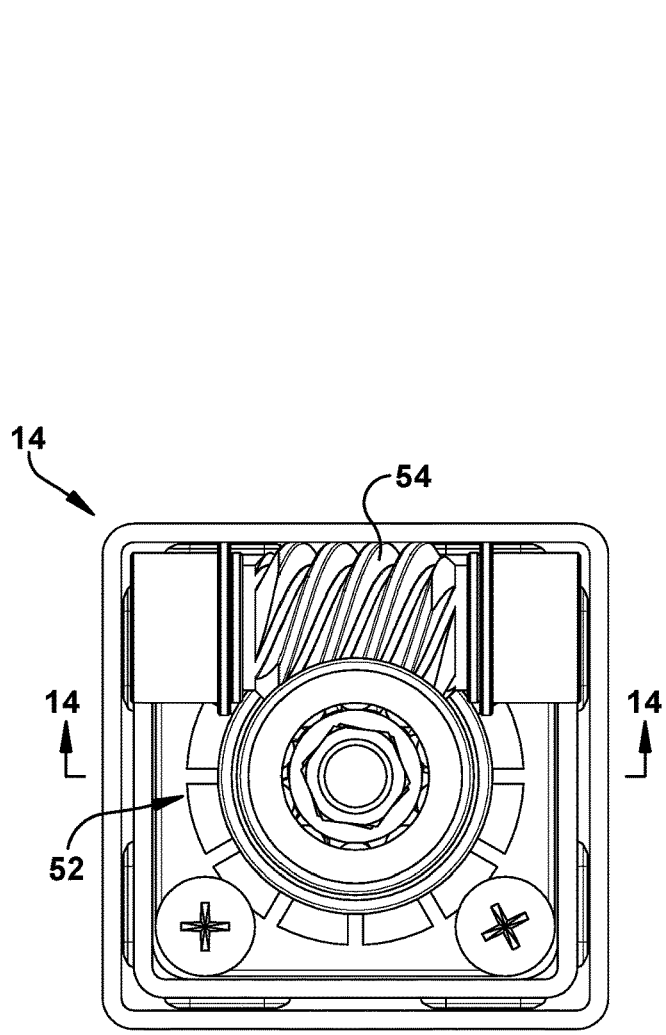
FIG. 13 is a top end view of the leg assembly in FIG. 11.

Referring to FIGS. 1-5, an exemplary adjustable platform 10 according to the present disclosure is shown. Generally, the adjustable platform 10 includes an upper platform surface 12, at least two leg assemblies 14a, 14b supporting the upper platform surface 12, and a drive mechanism 16 that is configured to extend or retract the leg assemblies 14a, 14b (collectively referred to with numeral 14 for clarity) to raise or lower the platform. The drive mechanism 16 is configured to extend or retract the leg assemblies 14 between a first position, in which each leg assembly 14 is retracted to lower the upper platform surface 12 toward ground (as shown in FIG. 1, for example), and a second position, in which each leg assembly 14 is extended to raise the upper platform surface 12 away from the ground (as shown in FIG. 3, for example). As shown, the leg assemblies also may be extended/retracted to any intermediate position (FIG. 2, for example) between the first (lower) position and second (raised) position.

As discussed in further detail below, according to an aspect of the present disclosure, the drive mechanism 16 includes a single motor 20 that is drivingly coupled to each of the at least two leg assemblies 14a and 14b, in which the drive mechanism 16 is configured to simultaneously extend or retract both of the leg assemblies 14a, 14b between the first position (FIG. 1) and second position (FIG. 3) to thereby lower or raise the upper platform surface 12 relative to the ground. Providing only a single motor that drives at least two of the leg assemblies minimizes the number of drive components that may otherwise be required for driving each leg assembly and improves the ability to control the simultaneous movement of each leg assembly between the first and second positions, among other considerations.

In the illustrated embodiment, the adjustable platform 10 is configured as an adjustable desk (also referred to with reference numeral 10 for clarity). The adjustable desk 10 has a first pair of leg assemblies (14a, 14b) that is drivingly coupled to the motor 20 as discussed above, and a second pair of leg assemblies (14c, 14d) that is drivingly coupled to another single motor of a second drive mechanism 17 (hidden from view) that is the same as the first drive mechanism 16. In exemplary embodiments, the first drive mechanism 16 and the second drive mechanism 17 cooperate with each other such that the first drive mechanism 16 simultaneously extends or retracts the first pair of leg assemblies (14a, 14b) at the same time that the second drive mechanism 17 simultaneously extends or retracts the second pair of leg assemblies (14c, 14d), thereby lowering or raising the upper platform surface 12 level to the ground.

As shown, the adjustable desk 10 includes a first side panel 22 that extends between the first pair of leg assemblies (14a, 14b) and a second side panel 23 that extends between the second pair of leg assemblies (14c, 14d). In exemplary embodiments, each side panel 22, 23 is configured to conceal the corresponding drive mechanism 16, 17 and its moving components, which are described in further detail below. As shown, each side panel 22, 23 also may include a housing portion 24 that contains the corresponding motor (e.g., 20), in which this housing portion 24 has a relatively small and tapered profile to enhance its concealment when viewing the desk from the front.

Referring particularly to FIGS. 6-10, the exemplary drive mechanism 16 is described in further detail. As discussed above, the drive mechanism 16 includes the single motor 20 that is drivingly coupled to each of the at least two leg assemblies 14a and 14b to simultaneously extend or retract each of the leg assemblies along a longitudinal axis (L) that is transverse to ground. As shown, the motor 20 is drivingly coupled to a drive shaft 26 that is drivingly coupled to each of the at least two leg assemblies 14. The drive shaft 16 extends along a transverse axis (T), and is rotatable about its axis by the motor 20 to drive a linear actuator 28 in each of the at least two leg assemblies 14. In exemplary embodiments, the drive shaft 26 is a single drive shaft that extends from the first leg assembly 14a to the second leg assembly 14b. By using a single drive shaft, the number of components of the drive mechanism is minimized. In addition, the use of a single drive shaft allows the motor 20 to be disposed along any position along the length of the shaft 26, which enhances the flexibility of the design by allowing the drive mechanism to be adapted to other product configurations, or which may allow for improved concealability of the drive components based on the platform design.

The motor 20 may be any suitable motor, such as a low-speed, high-torque motor. In exemplary embodiments, the motor 20 is an electric motor having an output shaft 30 that is drivingly coupled to the drive shaft 26. As shown, the output shaft 30 of the motor 20 extends along an axis that is transverse to the axis (T) of the drive shaft. A gear train 32 is operatively coupled to the output shaft 30 of the motor 20 and the drive shaft 26 to translate rotational motion of the output shaft 30 to rotational motion of the drive shaft 26. In the illustrated embodiment, the gear train 30 is a worm gear train, in which the output shaft 30 of the motor 20 has a worm 34 that is meshingly coupled to a worm gear 36 of the drive shaft 26. Such a configuration allows the output shaft 30 of the motor 20 to rotate in forward or reverse, which correspondingly moves the drive shaft 26 in a forward or reverse direction to extend or retract the linear actuators 28 of the leg assemblies 14. As shown, the motor may include a mounting portion 38 through which the drive shaft 26 extends via a bearing 40 contained in a collar 42 of the mounting portion 38. In the illustrated embodiment, the motor 20 is inclined by an angle relative to a vertical plane containing the leg assemblies 14 (as shown in FIG. 7, for example). Such a configuration helps to minimize the amount the motor 20 protrudes from between the leg assemblies 14, and hence the side panels 22, and thus helps to minimize its profile and enhance concealability of the motor.

Referring particularly to FIGS. 6-22, one of the exemplary leg assemblies is shown in further detail. As discussed above, the motor 20 drives the drive shaft 26, which is drivingly coupled to each of the leg assemblies 14a and 14b, such that rotation of the drive shaft 26 actuates a linear actuator mechanism 28 in the leg assembly. In exemplary embodiments, the linear actuator 28 in each leg assembly includes a movable rod 50 that extends along the longitudinal axis (L) and at least partially supports the upper platform surface 12. The movable rod 50 is drivingly coupled to a linkage 52 such that the drive shaft 26 moves the movable rod 50 via the linkage 52. As discussed in further detail below, the movable rod 50 is configured to move axially along the longitudinal axis (L) relative to ground to raise or lower the upper platform surface 12 when driven by the drive shaft 26 via the linkage 52.

In exemplary embodiments, the linkage 52 in the leg assembly includes a gear train (also referred to with reference numeral 52 for clarity) that drivingly couples the drive shaft 26 to the movable rod 50. Generally, the gear train 52 is configured to translate rotational movement of the drive shaft 26 about the transverse axis (T) into movement of the rod 50, such that the rod 50 moves axially along the longitudinal axis (L) to extend or retract the leg assembly 14. In exemplary embodiments, the gear train 52 translates rotational movement of the drive shaft 26 about the transverse axis (T) into rotation of the rod 50 about its longitudinal axis (L), in which the rod 50 is configured to interact with a portion of a support member 60 of the leg assembly 14 to thereby move the rod 50 axially along the longitudinal axis (L) relative to the support member 60 and the ground, as discussed in further detail below. The gear train 52 may include a worm gear train having a worm screw 54 operatively coupled to the drive shaft 26 and a worm gear 56 operatively coupled to the movable rod 50, in which the worm screw 54 meshingly engages with the worm gear 56 to rotate the movable rod 50.

In the illustrated embodiment, the movable rod 50 of the leg assembly includes a rotatable screw, such as a ball screw (also referred to with reference numeral 50 for clarity), having threads that are configured to be threadably received by a portion of the support member 60. As shown, the support member 60 includes a receiver 61 having an internal bore with threads that receive the threads of the screw 50 and allow the screw to be threaded into and out of the receiver 61. The receiver 61, which may be a suitable nut or other member, is attached to or formed with the support member 60 so that it is fixedly attached to the support member 60, and therefore the receiver 61 moves axially along with the support member 60. In this manner, when the drive shaft 26 rotates the screw 50 via the gear train 52, the screw 50 will thread into our out of the receiver 61, thereby moving the screw 50 axially along the longitudinal axis (L) relative to the support member 60. Such extension or retraction of the screw 50 relative to the support member 60 may therefore be utilized to raise or lower the platform surface of the adjustable platform 10.

It is understood that although such a configuration of the linear actuator is shown and described with the rod 50 being rotatable and interacting with the support member 60 to extend and retract the leg assembly 14, other configurations are possible as would be understood by those having ordinary skill in the art. For example, the drive shaft 26 may be drivingly coupled to a rotatable wheel, such as a gear, that moves a cable, rack, chain or belt to produce such linear motion, such as a rack and pinion drive, for example. Furthermore, it is understood that although the gear train 52 is shown having a worm gear train, other gear trains are possible, as would be understood by those having ordinary skill in the art. For example, the gear train 52 may include a spur gear, helical gear, bevel gear, or any other similar gear train.

In exemplary embodiments, each of the leg assemblies 14 is a telescoping leg assembly having at least one outer support member 62 (e.g., upper support member) and at least one support member 60 that is telescopically movable within the outer support member 62. The movable rod 50 may be operatively coupled to one of the support members, such as the outer support member 62, such that axial movement of the movable rod 50 relative to the other support member 60 telescopically collapses or telescopically extends the leg assembly 14.

Figure 14:
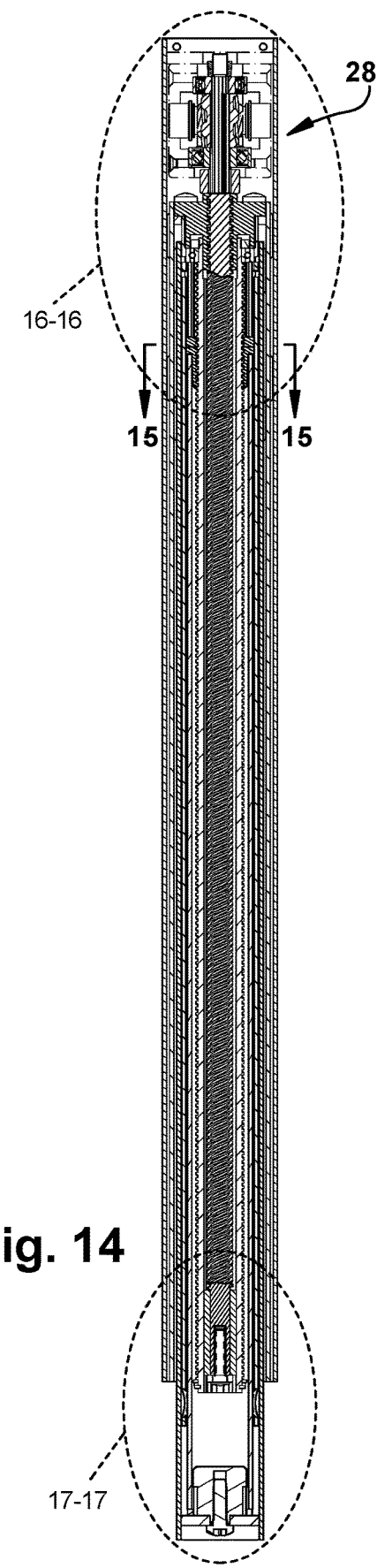
FIG. 14 is a cross-sectional side view of the leg assembly in an exemplary collapsed position, which is taken along the line 14-14 in FIG. 13.
Figure 15:
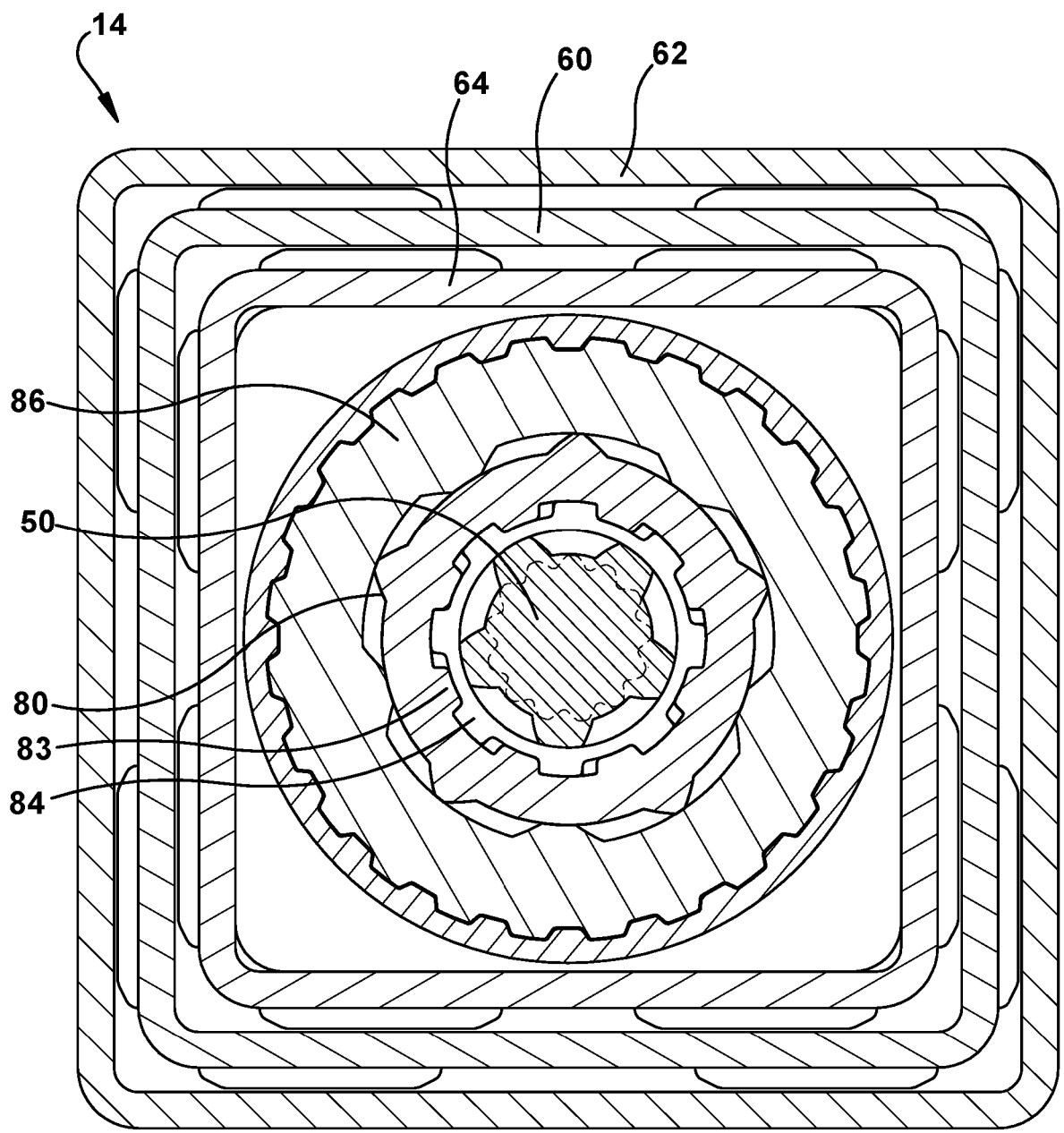
FIG. 15 is a cross-sectional top view of the leg assembly taken along the line 15-15 in FIG. 14.
Figure 18:
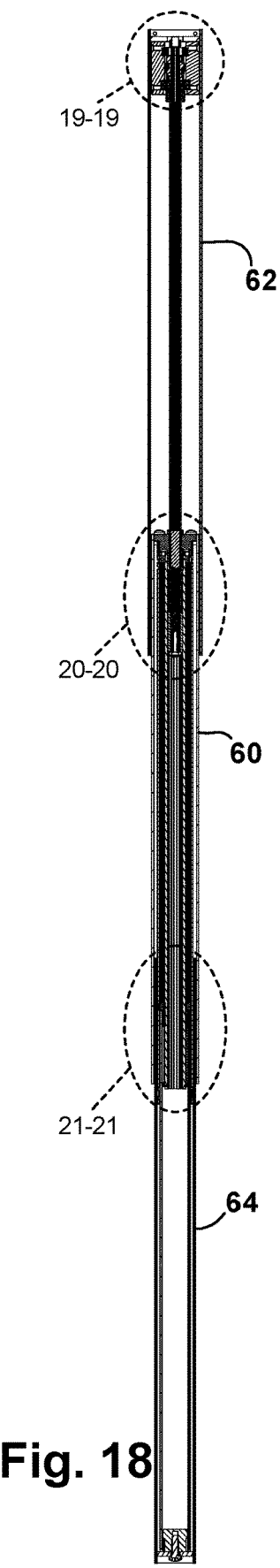
FIG. 18 is a cross-sectional side view of the leg assembly in an exemplary extended position.
Figure 19:
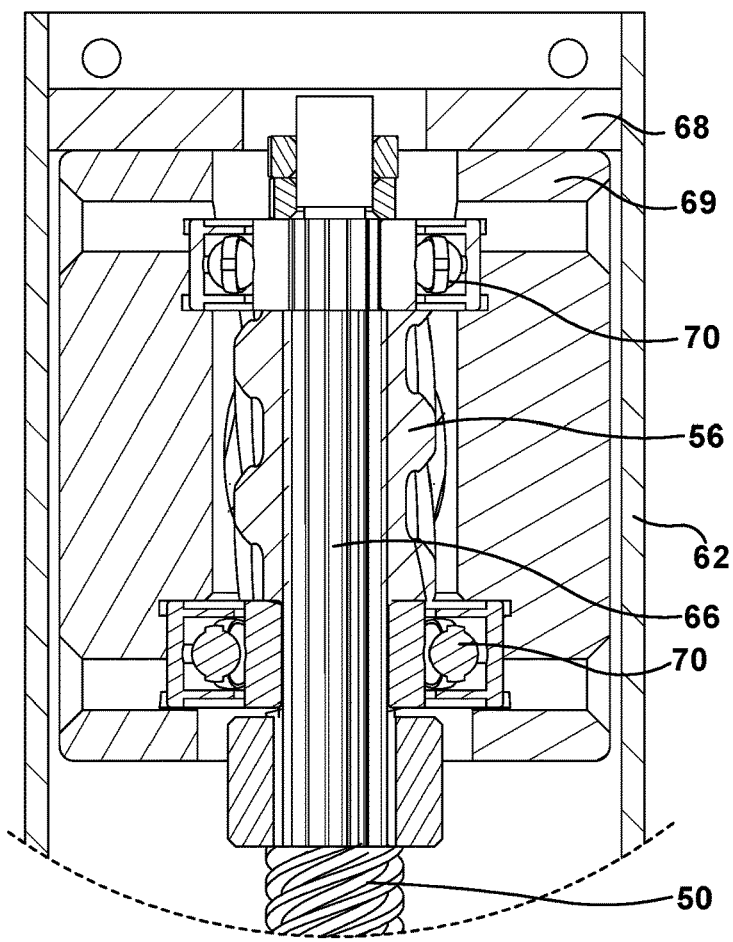
FIG. 19 is an enlarged cross-sectional view of section 19-19 in FIG. 18.

More particularly, in the illustrated embodiment, each of the leg assemblies 14 is a telescoping leg assembly having the outer support member 62 (e.g. upper support member), the intermediate support member 60 (e.g., middle support member) that is telescopically movable in the outer support member 62, and an inner support member 64 (e.g., lower support member) that is telescopically movable in the intermediate support member 60. As shown, the rotatable screw 50 is a first screw 50 having a first end portion 66 operatively coupled to a downstream gear (e.g., worm gear 56) of the gear train 52, such that rotation of the drive shaft 26 drives the rotation of the first screw 50. In the illustrated embodiment, the first screw 50 is coupled to the worm gear 52 via a spline interface. The first end portion 66 of the first screw 50 is also operatively coupled to the outer support member 62 such that the outer support member 62 moves axially with the first end portion 66 of the screw 50. In the illustrated embodiment, the first end portion 66 of the first screw 50 is operatively coupled to a tubular sleeve portion of the outer support member 62 via a weld plate 68 attached to a block 69 which contains bearings 70 that encompass the first end portion 66 and/or worm gear 56 (as shown in FIG. 19, for example). It is understood, however, that the first screw 50 spins freely inside the outer (e.g., upper) support member 62 by being support by the bearing(s) 70. Toward the opposite (second) end portion 72 of the first screw 50 is the receiver 61 having the internally threaded bore for threadably receiving the threads of the first screw 50. The receiver 62 is a first receiver that is operatively coupled to the intermediate support member 60 such that the intermediate support member 60 moves axially with the receiver 61. In the illustrated embodiment, the first receiver 61 is fixedly attached to a tubular portion of the intermediate support 60 member via a weld plate 74 and/or other suitable attachment. In this manner, when the first screw 50 is threadably screwed into the first receiver 61, the outer support member 62 moves axially relative to the intermediate support member 60 toward a telescopically collapsed position (FIG. 14). Likewise, when the first screw 50 is threadably screwed into the first receiver 61, the outer support member 62 moves axially relative to the intermediate support member 60 toward a telescopically extended position (FIG. 18).

Figure 20:
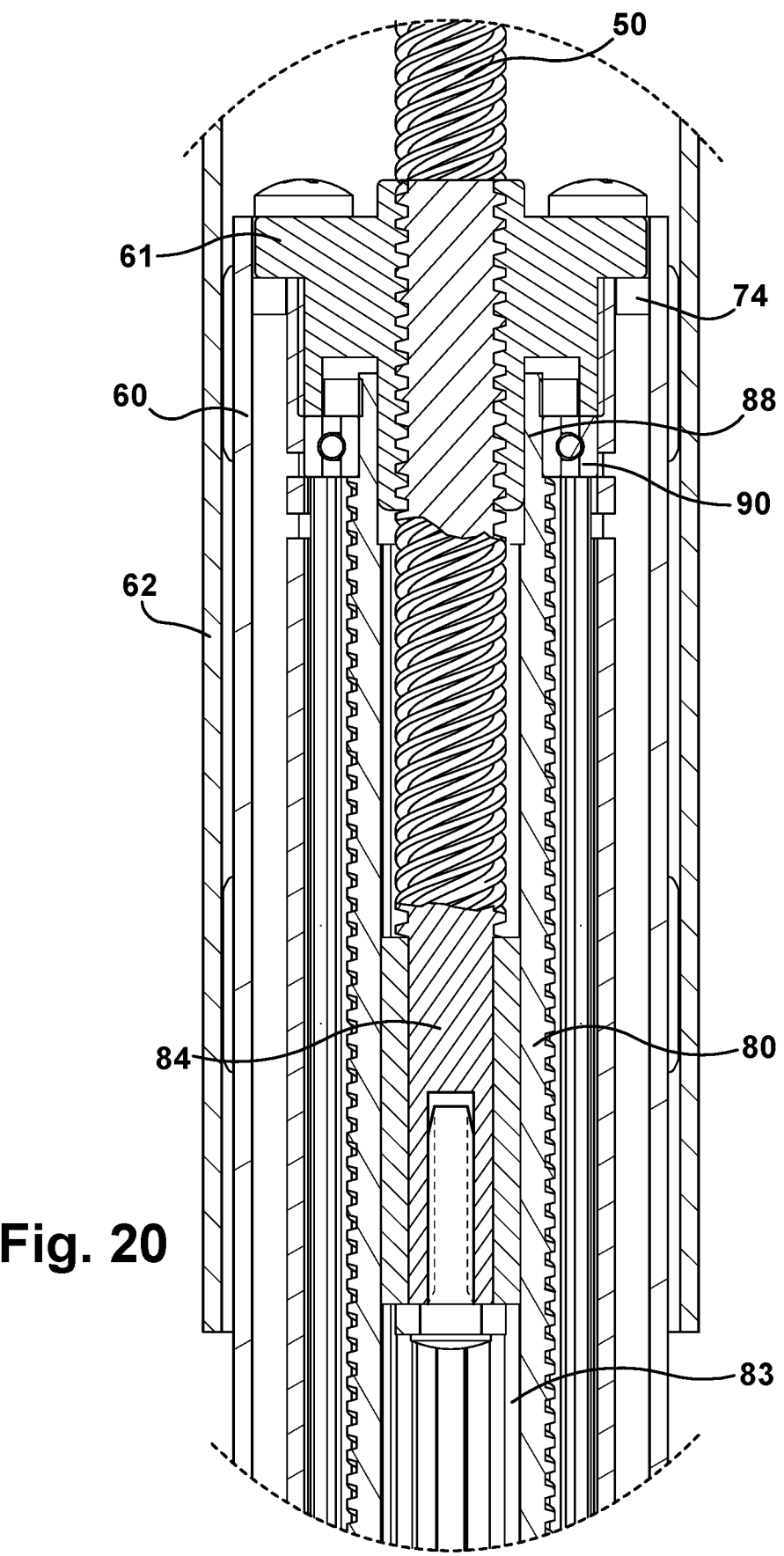
FIG. 20 is an enlarged cross-sectional view of section 20-20 in FIG. 18.
Figure 21:
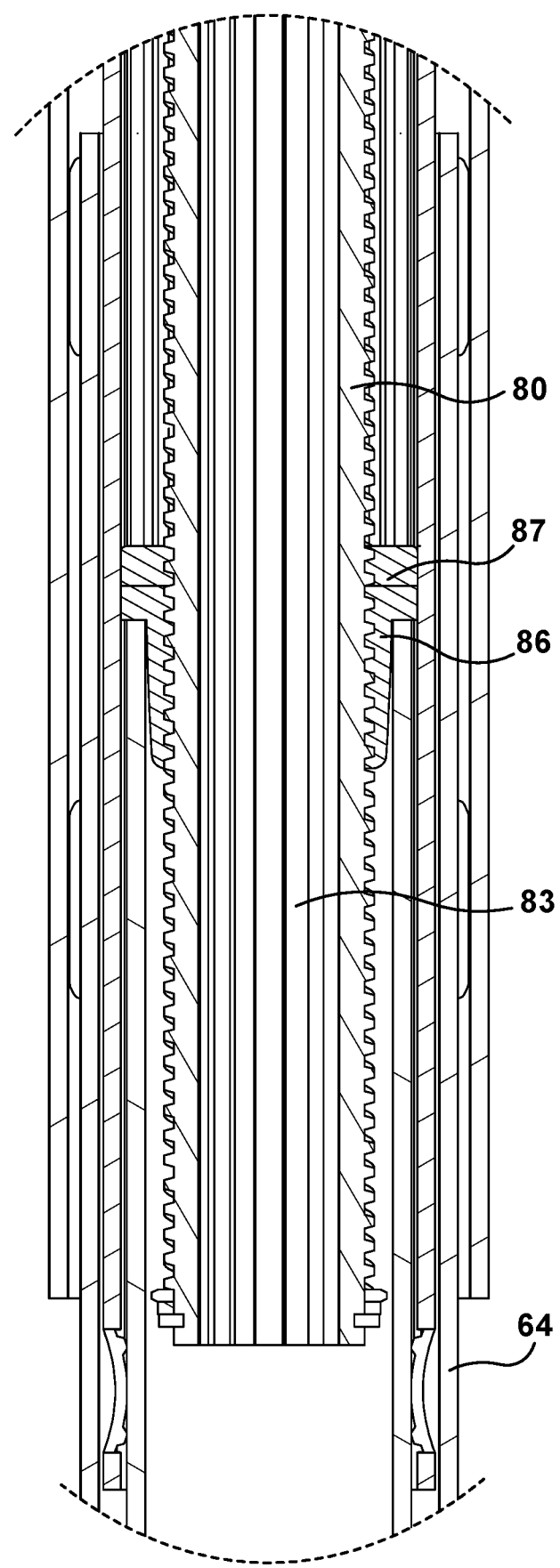
FIG. 21 is an enlarged cross-sectional view of section 21-21 in FIG. 18.
Figure 22:
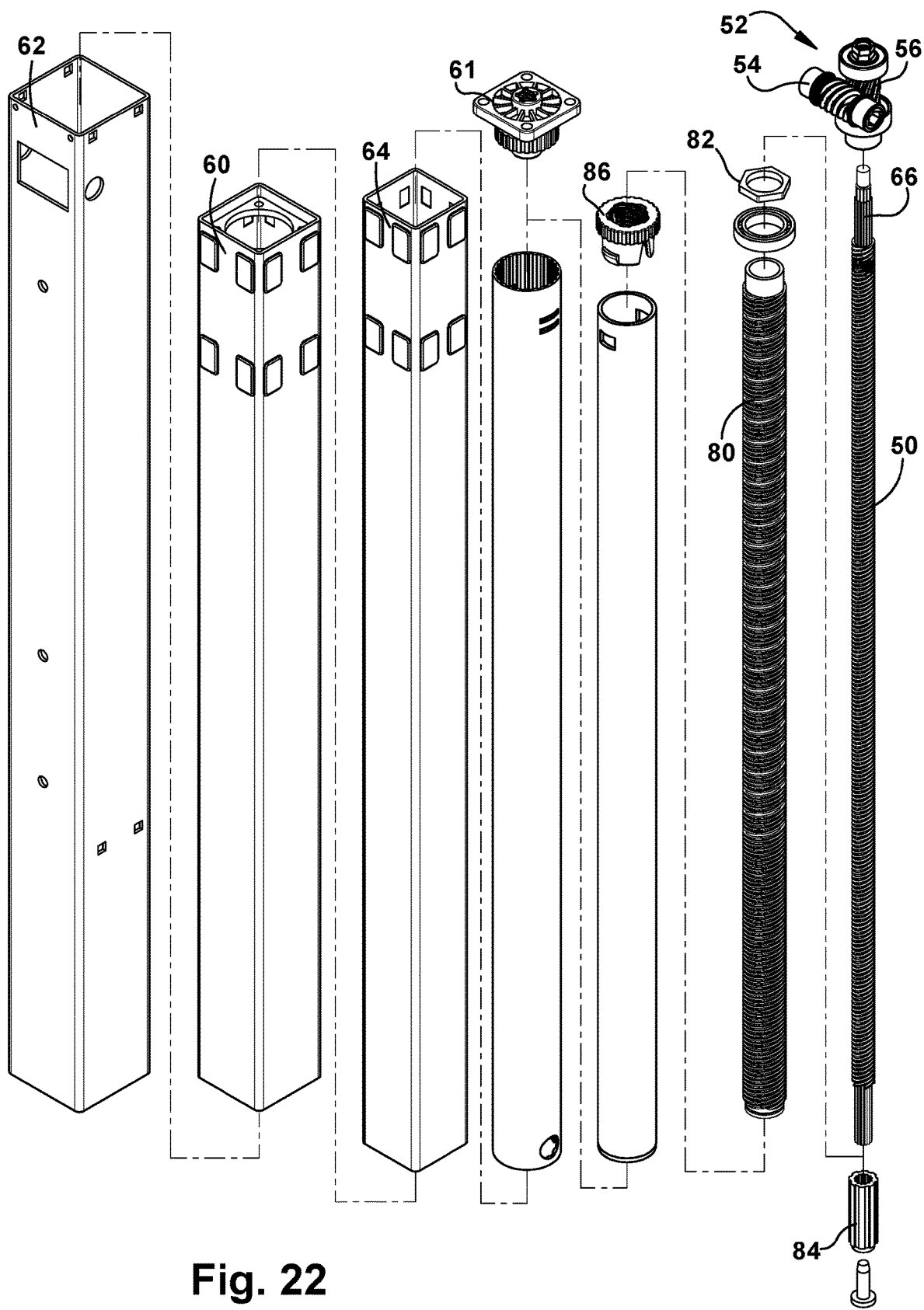
FIG. 22 is an exploded perspective view of the leg assembly.

In the illustrated embodiment, each leg assembly 14 also includes a second screw 80, such as a ball screw, that extends along the longitudinal axis. The second screw 80 includes an axially extending internal bore 82 with radially inwardly projecting spline teeth 83 that extend axially along at least a portion of the internal bore 82. The first screw 50 is slidably disposed within the internal bore 82 of the second screw 80, and the first screw 50 is configured to engage and drive the second screw 80 with radially outwardly projecting spline teeth 84 that engage the spline teeth 83 of the second screw 80. Because the spline teeth 83 of the second screw 80 extend axially along the internal bore 82, the first screw 50 can slide axially along the bore 82 with its spline teeth 84 maintaining engagement with the spline teeth 83 of the second screw 80. As shown, the inner (e.g., lower) support member 64 has a second receiver 86 fixedly attached to a tubular portion of the inner support member 64 (such as via a plate 87) such that the second receiver 86 moves axially with the inner support member 64. The second receiver 86, such as a nut or other suitable member, includes an internally threaded bore that threadably receives the second screw 80 in a similar manner to the first screw 50 and first receiver 61. One end portion 88 of the second screw 80 is operatively coupled to the intermediate support member 60, such as via a plate having bearings 90 (which may be operatively coupled to the first receiver 61, as shown in FIG. 20, for example) so that the end portion 88 of the second screw 80 moves axially with the intermediate support member 60. It is understood, however, that the second screw 80 spins freely inside the intermediate support tube 60 by being support by the bearing 90, for example. In this manner, when the second screw 80 is threadably screwed into the second receiver 86, the inner support member 64 moves axially relative to the intermediate support member 60 toward a telescopically collapsed position (FIG. 14). Likewise, when the second screw 80 is threadably screwed into the second receiver 86, the inner support member 64 moves axially relative to the intermediate support member 60 toward a telescopically extended position (FIG. 18).

The action of the linear actuator may be envisioned by considering the intermediate (e.g., middle) support member 60 to be stationary and the outer (e.g., upper) support member 62 and the inner (e.g., lower) support member 64 as extending away from the intermediate support member 60. The gear train 52 at the top drives the two ball screw type mechanisms 50 and 80. In exemplary embodiments, the pitch of the respective spline teeth 83, 84 for the first screw 50 and the second screw 80 are the same so that they rotate at the same rate (rpm). In this manner, the first screw 50 drives the outer (e.g. upper) support member 62 away from the intermediate member 60 at the same rate that the second screw drives 80 the inner (e.g., lower) support 64 member away from the intermediate member 60. In exemplary embodiments, the desk height at its lowest position is about 22.5 inches from ground to the top of the platform surface, and at its highest position is approximately 48.7 inches from the ground to follow BIFMA standards.

Figure 23:
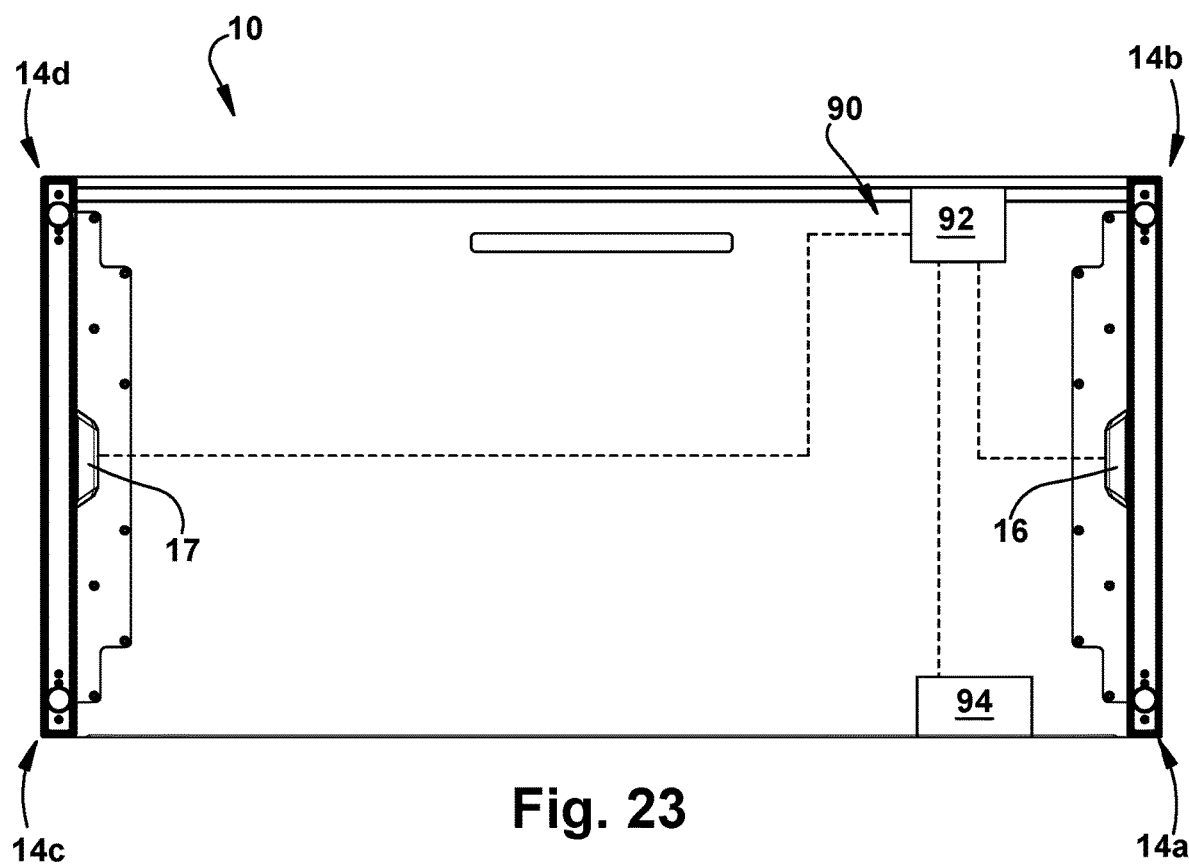
FIG. 23 is a schematic top view of the adjustable platform including an exemplary control device.

Referring to FIG. 23, a schematic view of a control device 90 of the adjustable platform 10 is shown. As shown, the control device 90 includes a controller 92 that is operatively coupled to each of the motors and/or drive mechanisms 16, 17 to thereby control such devices. In addition, a user interface 94 is operatively coupled to the controller 92 to control the drive mechanisms 16, 17. The user interface 94 may have suitable inputs, such as a touch screen, push-button panel, or the like, for allowing the user to interface with the controller. The user interface 94 also may have a display, such as a digital readout, that may display the height of the table, for example. The user interface 94 may be mounted to an underside of the upper platform surface, such as toward a front of the desk, as shown in FIG. 1, for example.

In exemplary embodiments, the user interface 94 includes an input for raising the platform to any position, in which the controller 92 is configured to activate the drive mechanism(s) 16, 17 to raise the platform to any position toward the raised (second) position (FIG. 3), such as in the manner described above. The user interface 94 also may include an input for lowering the platform to any position, in which the controller 92 is configured to activate the drive mechanism(s) 16, 17 to lower the platform to any position toward the lowered (first) position (FIG. 1). The user interface 94 may further include an input for setting a desired raised and/or lowered position, in which the desired raised and/or lowered position is stored in a non-transitory computer readable storage medium. For example, if a user desires a certain height of the desk while sitting, the controller 92 may store this preset desired position in memory, whereupon when the user selects the input for this preset condition, the desk moves to that position. Likewise, the user input may include an input for selecting a desired raised position, such as for standing at the desk, in which the controller 92 is configured to activate the drive mechanism to automatically move the platform to the desired raised position. Further inputs may be provided for searching the menu of the controller and/or setting the desired raised and/or lowered positions, in which the desired raised and/or lowered positions may be stored in a non-transitory computer readable storage medium. The controller 92 and/or memory may be able to store such preset conditions for two, three, four or more users, with a further input for selecting the user, which would then map to that user's desired preset conditions. The user interface 94 also may have a lock feature for preventing movement of the drive mechanisms 16, 17.

The controller 92 also may be configured to monitor output of the motor(s) 20 (such as via current, torque or other suitable sensors) and/or monitor the distance by which each of the leg assemblies 14 extends or retracts (such as via hall sensors and/or other suitable sensors). During an initialization routine, the controller 92 may activate the drive mechanisms 16, 17 to fully lower the desk to its lowest position and then zero the positional sensors. The controller 92 may monitor the extension of the leg assemblies 14 via the positional sensors and stop movement once a predetermined positional threshold is reached. Alternatively or additionally, the controller 92 may monitor the motor(s) 20 output and stop movement once a predetermined output threshold, such as current or torque, is reached. For example, such monitoring may allow the controller 92 to stop movement when the leg assemblies 14 are fully collapsed and bottomed out.

The controller 92 also may be operatively coupled to one or more switches 95 that deactivate the drive mechanism 16, 17 when the switch 95 is activated. For example, as shown in FIGS. 5 and 6, the adjustable platform may further include a transverse bumper bar 96 extending between the two leg assemblies 14a, 14b. The transverse bumper bar 96 includes one or more spring-loaded pins 97 that are configured to activate the switch 95, which deactivates the drive mechanism 16 when the bumper bar 96 compresses the spring beyond a predefined distance. This may occur, for example, if an object is wedged between the bumper bar 96 and the ground when the desk is being lowered toward the ground, for example.

While a preferred form of the exemplary adjustable platform has been described above, it should be apparent to those skilled in the art that other platform designs could also be according to the present disclosure. The aspects of the present disclosure are not limited to any particular platform design, but rather are appropriate for a wide variety of platform designs.

It is understood that exemplary embodiments of the adjustable support structure can be implemented in combination with digital electronic circuitry, or computer software, firmware, or hardware, such as for utilizing the drive mechanism and/or adjusting the various positions of adjustable support. In exemplary embodiments, an adjustable support structure as described herein may use one or more modules of computer program instructions encoded on a computer-readable medium for execution by, or to control the operation of, data processing apparatus. The computer-readable medium can be a manufactured product, such as non-transitory computer readable medium, for example a hard drive in a computer system. A controller may be used, which includes all apparatus, devices, and machines for processing data, including by way of example a programmable processor or a computer. A computer program (also known as software or code) can be written in any form of programming language and it can be deployed in any form, including as a stand-alone program or as a module, component, subroutine, or other unit suitable for use in a computing environment. To provide for interaction with a user, an exemplary support structure can be implemented using a computer having a display device, e.g., an LED (light emitting diode) display monitor, for displaying information to the user, and a keyboard or touch panel or pointing device, e.g., a mouse, by which the user can provide input to the computer.

As used herein, the terms "upper", "lower", "top", "bottom," "front," "rear," "inner," "outer," "left," "right," "above," "below," and the like as used in this disclosure should be understood as referring to an arbitrary frame of reference, for example viewing an exemplary adjustable platform in a horizontal position as shown in FIG. 1, rather than to the ordinary gravitational frame of reference. This is done realizing that these units can be mounted on the top, bottom, or sides of other components, or can be inclined with respect to a platform, or can be provided in various other positions.

As used herein, an "operable connection" or "operable coupling," or a connection by which entities are "operably connected" or "operably coupled" is one in which the entities are connected in such a way that the entities may perform as intended. An operable connection may be a direct connection or an indirect connection in which an intermediate entity or entities cooperate or otherwise are part of the connection or are in between the operably connected entities.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both," and thus "or" as used herein is the inclusive, and not the exclusive use. When intended to indicate "only A or B but not both" then the term "only A or B but not both" will be employed.

Although the present disclosure has shown and described a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature according to the disclosure may have been described above with respect to only one or more of several illustrated embodiments, such feature may be combined with one or more other features of the other embodiments, as may be desired and advantageous for any given or particular application.

What is claimed is:

1. An adjustable platform, comprising:
an upper platform surface;
a first pair and a second pair of leg assemblies disposed on respective opposite first and second sides of the adjustable platform, wherein upper portions of the pairs of leg assemblies are operatively coupled to and supporting the upper platform surface, and wherein each pair of leg assemblies is configured to extend or retract between a first position, in which each pair of leg assemblies is retracted to lower the upper platform surface toward ground, and a second position, in which each pair of leg assemblies is extended to raise the upper platform surface away from the ground;
first and second mechanically independent drive mechanisms disposed opposite one another with the first drive mechanism disposed between leg assemblies of the first pair of leg assemblies and with the second drive mechanism disposed between leg assemblies of the second pair of leg assemblies, wherein the first drive mechanism comprises a first single motor drivingly coupled to the first pair of leg assemblies and the second drive mechanism comprises a second single motor drivingly coupled to the second pair of leg assemblies;
a controller configured to simultaneously control both the first and second drive mechanisms, wherein the controller is operatively coupled to a switch for each respective pair of leg assemblies, wherein the switches are configured to selectively deactivate the first and second drive mechanisms of each respective pair of leg assemblies; and
a transverse bumper bar extending between the leg assemblies of each pair of leg assemblies, the transverse bumper bars each having at least one spring-loaded pin that is configured to activate the respective switch that deactivates the first and second drive mechanisms when the bumper bars compress the springs beyond a predefined distance;
wherein the first and the second mechanically independent drive mechanisms are configured to simultaneously extend or retract the respective first and second pair of leg assemblies between the first position and the second position to thereby lower or raise the upper platform surface relative to the ground.

2. The adjustable platform according to claim 1, wherein the first motor is drivingly coupled to a first single drive shaft that is drivingly coupled to the first pair of leg assemblies, the first drive shaft being rotatable by the first motor to drive a first pair of linear actuators disposed in respective ones of the first pair of leg assemblies, which thereby extends or retracts the first pair of leg assemblies; and
wherein the second motor is drivingly coupled to a second single drive shaft that is drivingly coupled to the second pair of leg assemblies, the second drive shaft being rotatable by the second motor to drive a second pair of linear actuators disposed in respective ones of the second pair of leg assemblies, which thereby extends or retracts the second pair of leg assemblies.

3. The adjustable platform according to claim 2, wherein the linear actuator in each leg assembly of each of the first and second pairs of leg assemblies includes a movable rod that extends along a longitudinal axis and at least partially supports the upper platform surface, the movable rod being drivingly coupled to a linkage, wherein the respective drive shaft is configured to drive the movable rod via the linkage, and wherein the movable rod is configured to move axially along the longitudinal axis relative to ground to raise or lower the upper platform surface when driven by the respective drive shaft via the linkage.

4. The adjustable platform according to claim 3, wherein the first and second drive shafts extend between the respective leg assemblies of the first and second pairs of leg assemblies along a transverse axis that is transverse to the longitudinal axis of each leg assembly;
    wherein the linkage in each leg assembly of the first and second pairs of leg assemblies includes a first gear train that drivingly couples the respective drive shaft to the movable rod, the first gear train being configured to translate rotational movement of the respective drive shaft about the transverse axis into simultaneous movement of each rod, such that each rod of the at least two leg assemblies moves axially along the longitudinal axis to simultaneously extend or retract each of the leg assemblies between the first position and second position, thereby lowering or raising the upper platform surface relative to the ground; and
    wherein the first gear train in each leg assembly is a worm gear train comprising a worm screw operatively coupled to the drive shaft and meshingly engaged with a worm gear operatively coupled to the movable rod.

5. The adjustable platform according to claim 4, wherein the first gear train translates rotational movement of the drive shaft about the transverse axis into rotation of each rod about its longitudinal axis, in which each rod is configured to interact with a portion of a support member of each leg assembly that extends along the longitudinal axis, such that the rod moves axially along the longitudinal axis relative to the support member and the ground.

6. The adjustable platform according to claim 5, wherein the support member of each leg assembly includes a portion having an internally threaded bore, and wherein the movable rod of each leg assembly includes a rotatable screw having threads that are threadably received by the internally threaded bore;
    wherein the first gear train translates rotational movement of the respective drive shaft about the transverse axis into rotation of the screw about its longitudinal axis, such that the screw is configured to screw into and out of the internally threaded bore of the support member, thereby moving the screw axially along the longitudinal axis relative to the support member and the ground.

7. The adjustable platform according to claim 1, wherein each leg assembly is a telescoping leg assembly having at least one outer support member and at least one inner support member that is telescopically movable in the at least one outer support member, such that in the first position each leg assembly is telescopically collapsed, and in the second position each leg assembly is telescopically extended.

8. The adjustable platform according to claim 6, wherein each leg assembly is a telescoping leg assembly having an outer support member, an intermediate support member telescopically movable in the outer support member, and an inner support member telescopically movable in the intermediate support member;
    wherein the rotatable screw is a first screw having a first end portion operatively coupled to a downstream gear of the first gear train, such that rotation of the respective drive shaft drives the rotation of the first screw;
    wherein the first end portion of the first screw is operatively coupled to the outer support member for common axial movement therewith;
    wherein the portion of the support member having the internally threaded bore is a first receiver configured to threadably receive the first screw and being operatively coupled to the intermediate support member for common axial movement therewith; and
    wherein, when the first screw is threadably screwed into or out of the first receiver, the outer support member moves axially relative to the intermediate support member.

9. The adjustable platform according to claim 8, wherein each leg assembly further includes a second screw extending along the longitudinal axis, the second screw having an axially extending internal bore with radially inwardly projecting spline teeth that extend axially along at least a portion of the internal bore;
    wherein the first screw is slidably disposed within the internal bore of the second screw, the first screw having a portion with radially outwardly projecting spline teeth that are configured to engage the radially inwardly projecting spline teeth of the second screw to drive rotation of the second screw with the first screw as the first screw moves axially relative to the second screw;
    wherein each leg assembly includes a second receiver configured to threadably receive the second screw, the second receiver being operatively coupled to the inner support member for common axial movement therewith; and
    wherein, when the second screw is threadably screwed into or out of the second receiver, the inner support member moves axially relative to the intermediate support member.

10. The adjustable platform according to claim 2, wherein the first and second motors are electric motors each having an output shaft that is drivingly coupled to the respective drive shaft.

11. The adjustable platform according to claim 10, wherein each respective output shaft of the first and second motors extends along an axis that is transverse to an axis of the respective drive shaft; and
    wherein a second gear train is operatively coupled to each respective output shaft of the first and second motors and the respective first and second drive shafts to translate rotational motion of each respective output shaft to rotational motion of the respective first and second drive shafts;
    wherein the second gear train is a worm gear train, in which each respective output shaft of the first and second motors includes a worm screw that meshingly engages a worm gear of the respective first and second drive shafts.

12. The adjustable platform according to claim 1, wherein the adjustable platform has a side panel laterally extending between the respective leg assemblies of each pair of leg assemblies, the side panels being configured to conceal the respective first and second drive mechanisms including housing portions that contain the respective first and second motors.

13. The adjustable platform according to claim 12, wherein each pair of leg assemblies extends upright along a vertical plane, and wherein the first and second motors are inclined relative to the vertical plane and towards the respective side panel extending between the leg assemblies of each respective pair of leg assemblies.

14. The adjustable platform according to claim 1, wherein the controller is operatively coupled to one or more sensors and is configured to monitor output of the first and second motors and monitor a distance by which each pair of leg assemblies extends or retracts; and
wherein the controller is configured to deactivate the first and second drive mechanisms when either pair of leg assemblies is in the first position or the second position.

15. The adjustable platform according to claim 14, wherein the controller is operatively coupled to a remote user interface, the user interface comprising:
an input for raising the platform, in which the controller is configured to activate the drive mechanism to raise the platform toward the second position;
an input for lowering the platform, in which the controller is configured to activate the drive mechanism to lower the platform toward the first position;
an input for setting a desired lowered position, in which the desired lowered position is stored in a non-transitory computer readable storage medium;
an input for selecting the desired lowered position, in which the controller is configured to activate the drive mechanism to automatically move the platform to the desired lowered position;
an input for setting a desired raised position, in which the desired raised position is stored in a non-transitory computer readable storage medium; and
an input for selecting the desired raised position, in which the controller is configured to activate the drive mechanism to automatically move the platform to the desired raised position.

16. The adjustable platform according to claim 14, wherein the controller is configured to monitor the respective outputs of the first and second motors and deactivate the first and second drive mechanisms once a predetermined motor output threshold is reached.

17. An adjustable platform, comprising:
an upper platform surface;
a pair of leg assemblies on each side of the adjustable platform, each pair of leg assemblies operatively coupled to and supporting a respective side of the upper platform surface, wherein each pair of leg assemblies is configured to extend or retract between a first position in which each pair of leg assemblies is retracted to lower the upper platform surface toward ground, and a second position in which each pair of leg assemblies is extended to raise the upper platform surface away from the ground; and
a drive mechanism disposed between the leg assemblies on each side of the adjustable platform, wherein the drive mechanisms are mechanically independent from one another and each comprises a motor drivingly coupled to a single drive shaft, wherein each drive shaft is drivingly coupled, via a linkage, to a pair of linear actuators each comprising a rotatable rod that is disposed in each leg assembly of each pair of leg assemblies to drivingly couple each drive mechanism to the respective leg assemblies of each pair of leg assemblies;
wherein each motor comprises a vertically extended output shaft including a worm screw that is meshingly coupled to a worm gear of the respective drive shaft, and each motor is positioned below the respective drive shaft;
wherein the linkage in each leg assembly comprises a gear train for converting rotation of the respective drive shaft about a horizontal axis to rotation of the rotatable rod about a vertical axis; and
wherein each of the drive mechanisms is configured to simultaneously extend or retract the respective pair of leg assemblies between the first position and the second position to thereby lower or raise the upper platform surface relative to the ground.

18. An adjustable platform, comprising:
an upper platform surface;
a pair of leg assemblies on each side of the adjustable platform with each pair of leg assemblies being operatively coupled to and supporting a respective side of the upper platform surface, wherein each pair of leg assemblies is configured to extend or retract between a first position in which each pair of leg assemblies is retracted to lower the upper platform surface toward ground, and a second position in which each pair of leg assemblies is extended to raise the upper platform surface away from the ground;
a drive mechanism disposed between the leg assemblies on each side of the adjustable platform, wherein the drive mechanisms are mechanically independent from one another and each comprises a motor drivingly coupled to a single drive shaft, wherein each drive shaft is drivingly coupled, via a gear train, to a pair of linear actuators each comprising a rotatable rod that is disposed in each leg assembly of each pair of leg assemblies to drivingly couple each drive mechanism to the respective leg assemblies of each pair of leg assemblies;
wherein each motor comprises a vertically extended output shaft including a worm screw that is meshingly coupled to a worm gear of the respective drive shaft, and each motor is positioned below the respective drive shaft;
wherein the linkage in each leg assembly comprises a gear train for converting rotation of the respective drive shaft about a horizontal axis to rotation of the rotatable rod about a vertical axis; and
wherein each of the drive mechanisms is configured to simultaneously extend or retract the respective pair of leg assemblies between the first position and the second position to thereby lower or raise the upper platform surface relative to the ground;
a controller that is configured to control the drive mechanism of each pair of leg assemblies, the controller being operatively coupled to (i) a remote user interface, (ii) one or more sensors to monitor output of the motor of each pair of leg assemblies or monitor a distance by which each pair of leg assemblies extends or retracts, and (iii) a switch that is configured to selectively deactivate the drive mechanism of each pair of leg assemblies; and
a transverse bumper bar extending between the leg assemblies of each pair of leg assemblies, each transverse bumper bar comprising a spring-loaded pin that is configured to activate the respective switch when the bumper bar compresses the spring of the pin beyond a predefined distance in response to the upper platform reaching the first position.

* * * * *